(12) United States Patent
Ikehata et al.

(10) Patent No.: US 7,140,827 B2
(45) Date of Patent: Nov. 28, 2006

(54) TRANSPORTING APPARATUS

(75) Inventors: Yoshiteru Ikehata, Shiga-ken (JP); Takayoshi Ono, Shiga-ken (JP); Yuichi Morimoto, Shiga-ken (JP)

(73) Assignee: Daifuku Co., Ltd., Osaka (JP)

( * ) Notice: Subject to any disclaimer, the term of this patent is extended or adjusted under 35 U.S.C. 154(b) by 0 days.

(21) Appl. No.: 10/899,542

(22) Filed: Jul. 27, 2004

(65) Prior Publication Data
US 2005/0036873 A1 Feb. 17, 2005

(30) Foreign Application Priority Data
Jul. 29, 2003 (JP) ............................. 2003-281677
Jul. 29, 2003 (JP) ............................. 2003-281678

(51) Int. Cl.
*B65G 35/00* (2006.01)
(52) U.S. Cl. ...................... 414/676; 406/77; 406/19; 406/89
(58) Field of Classification Search ............... 414/676; 406/77, 19, 88, 89
See application file for complete search history.

(56) References Cited

U.S. PATENT DOCUMENTS

| | | | | | |
|---|---|---|---|---|---|
| 3,253,756 | A | * | 5/1966 | Haley et al. ................... 225/2 |
| 3,408,113 | A | * | 10/1968 | Bouladon .................... 406/19 |
| 3,425,818 | A | * | 2/1969 | Plumat ....................... 65/182.2 |
| 3,485,616 | A | * | 12/1969 | Nitschke .................... 65/182.2 |
| 3,588,176 | A | * | 6/1971 | Byrne .......................... 406/84 |
| 3,834,885 | A | * | 9/1974 | Frank .......................... 65/106 |
| 4,103,789 | A | * | 8/1978 | Andrews et al. ............ 414/398 |
| 4,275,976 | A | * | 6/1981 | Sticht .......................... 406/28 |
| 4,567,957 | A | * | 2/1986 | Johnson ...................... 180/124 |
| 4,747,329 | A | * | 5/1988 | Lukens, Jr. .................... 83/29 |
| 4,944,635 | A | * | 7/1990 | Carlier et al. ................ 406/10 |
| 5,285,887 | A | * | 2/1994 | Hall ........................ 198/460.1 |
| 5,634,636 | A | * | 6/1997 | Jackson et al. ............. 271/225 |
| 5,862,907 | A | * | 1/1999 | Taylor .................... 198/781.05 |
| 5,868,549 | A | * | 2/1999 | Lee et al. ................ 414/791.6 |
| 6,021,888 | A | * | 2/2000 | Itoh et al. .................... 198/783 |
| 6,035,999 | A | * | 3/2000 | Hall ........................ 198/781.06 |
| 6,053,011 | A | * | 4/2000 | Lisec ........................... 65/104 |
| 6,190,094 | B1 | * | 2/2001 | Rediess et al. ............... 406/19 |
| 6,253,909 | B1 | * | 7/2001 | Kalm et al. ............. 198/781.06 |
| 6,309,144 | B1 | * | 10/2001 | Ingraham ..................... 406/19 |
| 6,315,104 | B1 | * | 11/2001 | Ebert ....................... 198/460.1 |
| 6,336,775 | B1 | * | 1/2002 | Morita et al. ................. 406/88 |
| 6,354,789 | B1 | * | 3/2002 | Takeuchi et al. ............ 414/676 |
| 6,676,365 | B1 | * | 1/2004 | Adam et al. .................. 406/83 |
| 6,779,650 | B1 | * | 8/2004 | Takasan et al. .............. 198/630 |

\* cited by examiner

*Primary Examiner*—Joe Dillon, Jr.
(74) *Attorney, Agent, or Firm*—The Webb Law Firm

(57) ABSTRACT

It is an object of the invention to provide an apparatus for transporting a transported object in a transporting direction as the transported object is supported by air, the apparatus having a plurality of transporting units. A specific transporting unit of the plurality of transporting units is controlled based on the transporting state of at least one other transporting unit. Thus, it is possible to reduce the number of problems that may occur during transporting.

15 Claims, 16 Drawing Sheets

TRANSPORTING APPARATUS

BACKGROUND OF THE INVENTION

The present invention relates to transporting apparatuses provided with a plurality of transporting means aligned in the transporting direction, each transporting means being provided with air-supplying-type support means for blowing air toward a lower surface portion of a transported object to contactlessly support the transported object and drive force application means for applying a drive force in the transporting direction to the transported object that is supported by air-supplying-type support means, and control means for controlling operation of the plurality of transporting means.

Such transporting apparatuses transport transported objects such as glass substrates for liquid crystal displays with the plurality of transporting means aligned in the transporting direction. In each transporting means, the drive force application means applies a drive force to the transported object, which is contactlessly supported by the air-supplying-type support means, to for example support a section of the transported object, such as both or one end of the transported object, in a contacting manner, thereby transporting the transported object by transferring it from the transporting means positioned on the upstream side in the transporting direction to the transporting means positioned on the downstream side in the transporting direction.

Among conventional transporting apparatuses, there are those in which the orientation in which a transported object is transported is horizontal or substantially horizontal, and those in which the transported object is transported in a vertical or near vertical orientation. Each will be explained next.

A conventional transporting apparatuses in which transported objects are transported in a horizontal or substantially horizontal orientation is described first. The air-supplying-type support means supplies air toward an intermediate portion of the lower surface portion between both end portions of the transported object that is transported in a horizontal or substantially horizontal orientation. The drive force application means has drive rotors for applying a drive force to support, in a contacting manner, both ends of a transported object that is transported in a horizontal or substantially horizontal orientation.

Also, a plurality of transporting means provided with such air-supplying-type support means and drive force application means are arranged adjacent to one another in the transporting direction, and by the control means starting the operation of the transporting means in accordance with an order to start operation, for example, a transported object that is transported in a horizontal or substantially horizontal orientation is transferred to the transporting means adjacent downstream in the transporting direction (for example, see JP 2002-321820A).

A conventional transporting apparatuses for transporting a transported object in a vertical or near vertical orientation is described next. The air-supplying-type support means is configured so as to blow air toward an intermediate portion between both end portions of the lower surface portion of the transported object, which is transported in a vertical or near vertical orientation, and the drive force application means has drive rotors for applying a drive force to support, in a contacting manner, a lower end portion of a transported object that is transported in a vertical or substantially vertical orientation.

Also, a plurality of transporting means provided with such air-supplying-type support means and drive-force application means are arranged adjacent to one another in the transporting direction, and by the control means starting operation of the transporting means through an order to start operation, for example, a transported object in a vertical or near vertical orientation is transferred to the transporting means adjacent downstream in the transporting direction (for example, see JP 2002-308423A).

In the transporting apparatuses of the two documents mentioned above, since the control means simply starts operation of the transporting means through an operation start command, for example, a specific transporting means is controlled without consideration of the state of the other transporting means, and thus there is a risk that problems may occur.

For example, in the conventional transporting apparatuses, even if a transporting means adjacent on the downstream side in the transporting direction cannot contactlessly support and carry the transported object that it is to be transferred to it, there is a possibility that the transporting means that is positioned upstream in the transporting direction will start operation. Consequently, there was a risk that the transported object could not be contactlessly supported and transported, resulting in the transported object coming into contact with the transporting means, for example, and being damaged.

Also, in conventional transporting apparatuses, the control means simply activates the air-supplying-type support means and the drive force application means of the transporting means to which the object is to be transferred and of the transporting means that is further upstream in the transporting direction to the transporting means to which the object is to be transferred, and thus there is a risk that the transporting means to which the object is to be transferred will not be capable of contactlessly supporting the object to be transferred and the transported object will come into contact with, for example, the transporting means to which it is to be transferred and be damaged. That is to say, after the air-supplying-type support means starts operating, the amount of air that is blown toward the lower surface portion of the transported object is not immediately an amount that is capable of contactlessly supporting the transported object, and rather it takes time from the start of operation until the transported object can be contactlessly supported. Consequently, there is the problem that the time between when the air-supplying-type support means starts operating until when the transported object is transferred is short, leading to instances in which the air-supplying-type support means cannot contactlessly support the transported object.

SUMMARY OF THE INVENTION

The present invention was arrived at in light of these problems, and it is an object thereof to provide a transporting apparatus that can solve the foregoing problems by controlling a specific transporting means of the plurality of transporting means in accordance with the transporting state of another transporting means.

In order to achieve the foregoing objects, a transporting apparatus according to the present invention is provided with a plurality of transporting means aligned in a transporting direction, each transporting means comprising air-supplying-type support means for blowing air toward a lower surface portion of a transported object to contactlessly support the transported object and drive force application means for applying a drive force in the transporting direction to the transported object that is supported by the air-supplying-type support means, and control means for controlling operation of the plurality of transporting means. The control means, based on a transporting state of at least one of the transporting means of the plurality of transporting means, controls the state of a separate transporting means of the plurality of transporting means.

Embodiments of the present invention are described below in reference to the drawings, but the present invention is defined by the appended claims and is not limited to these embodiments.

DETAILED DESCRIPTION OF PREFERRED EMBODIMENTS

A transporting apparatus according to the present invention is described with reference to the drawings. In the following embodiments, a glass substrate is used as an example of the transported object. However, a transported object is not limited to a glass substrate. It is possible to combine the features of the plurality of embodiments discussed below, provided there are no contradictions, and each of such combinations may be considered as an aspect of the present invention.

First Embodiment

As shown in FIGS. 1 to 3 and FIG. 10, the transporting apparatus is for transporting plate-shaped work pieces, such as glass substrates for liquid crystal display, as transported objects, and is provided with a plurality of transporting units 1 (transporting means), a control member H serving as control means for controlling operation of the plurality of transporting units 1, and a manually operated command member S for sending control information to the control member H.

Each transporting unit (transporting means) 1 carries a glass substrate 2 in a horizontal or substantially horizontal orientation.

Figure 1:
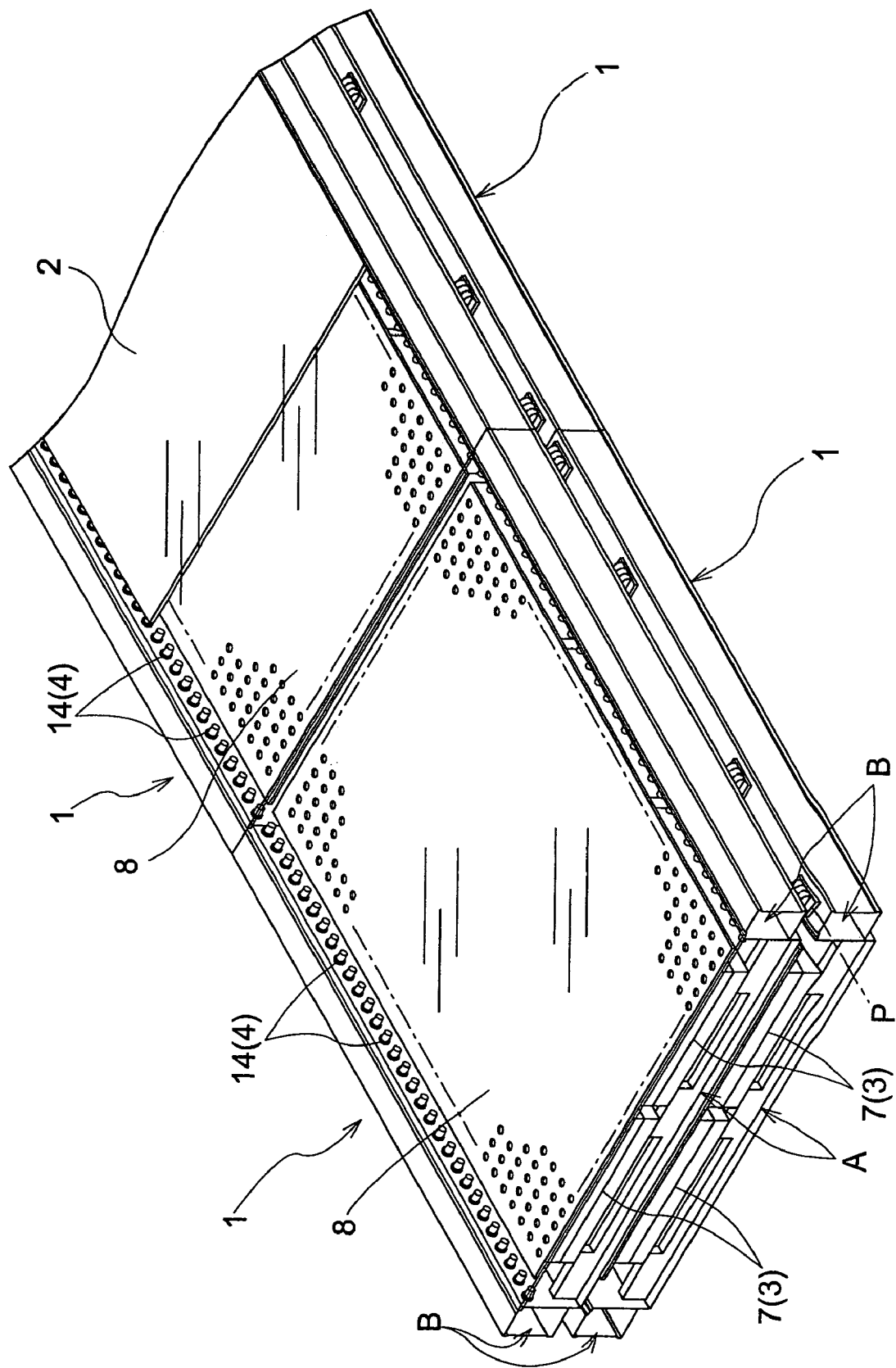
FIG. 1 is a perspective view in which a portion of a transporting apparatus according to the first embodiment has been omitted.
Figure 2:
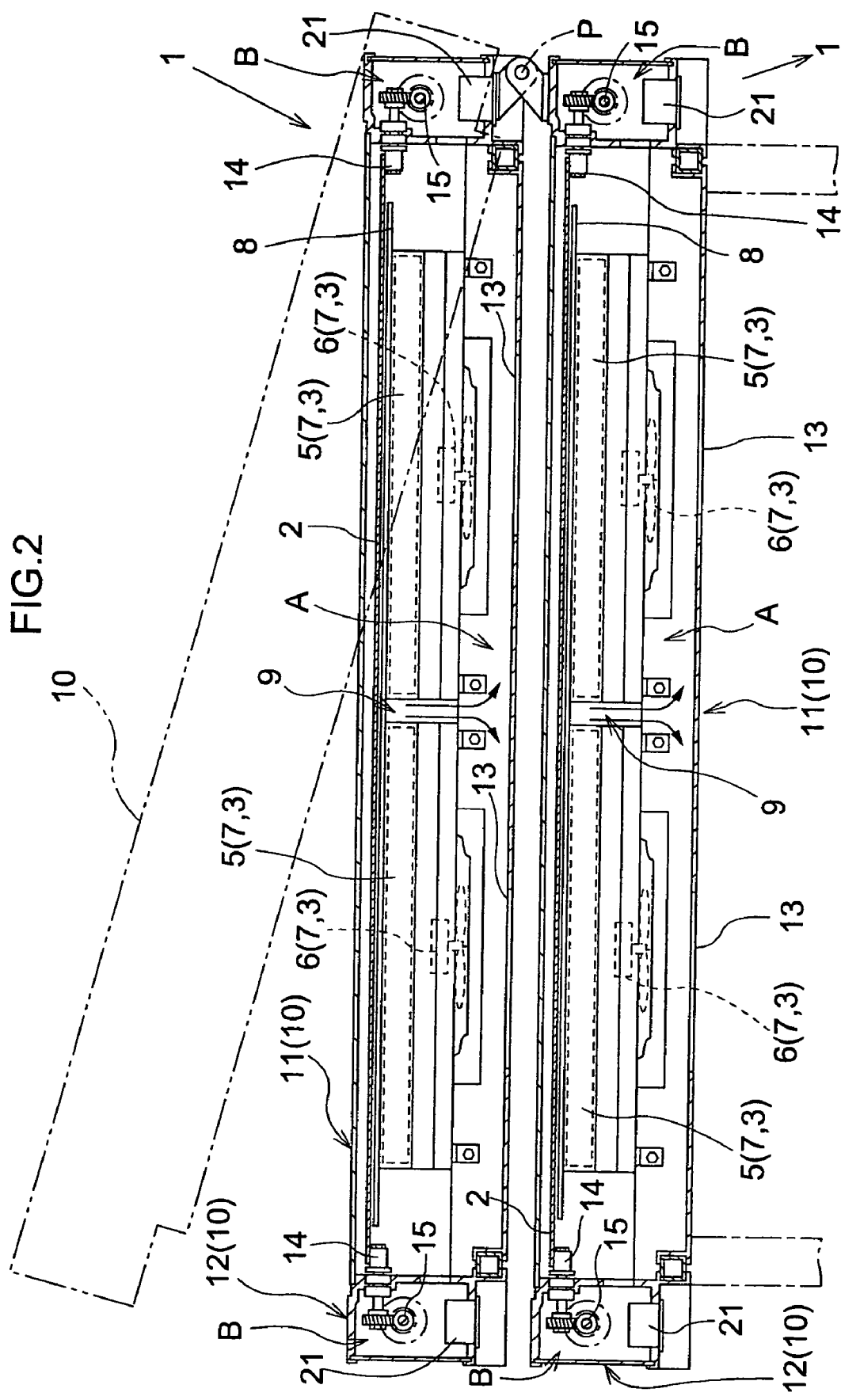
FIG. 2 is a vertical front sectional view of the transporting apparatus according to the first embodiment.
Figure 3:
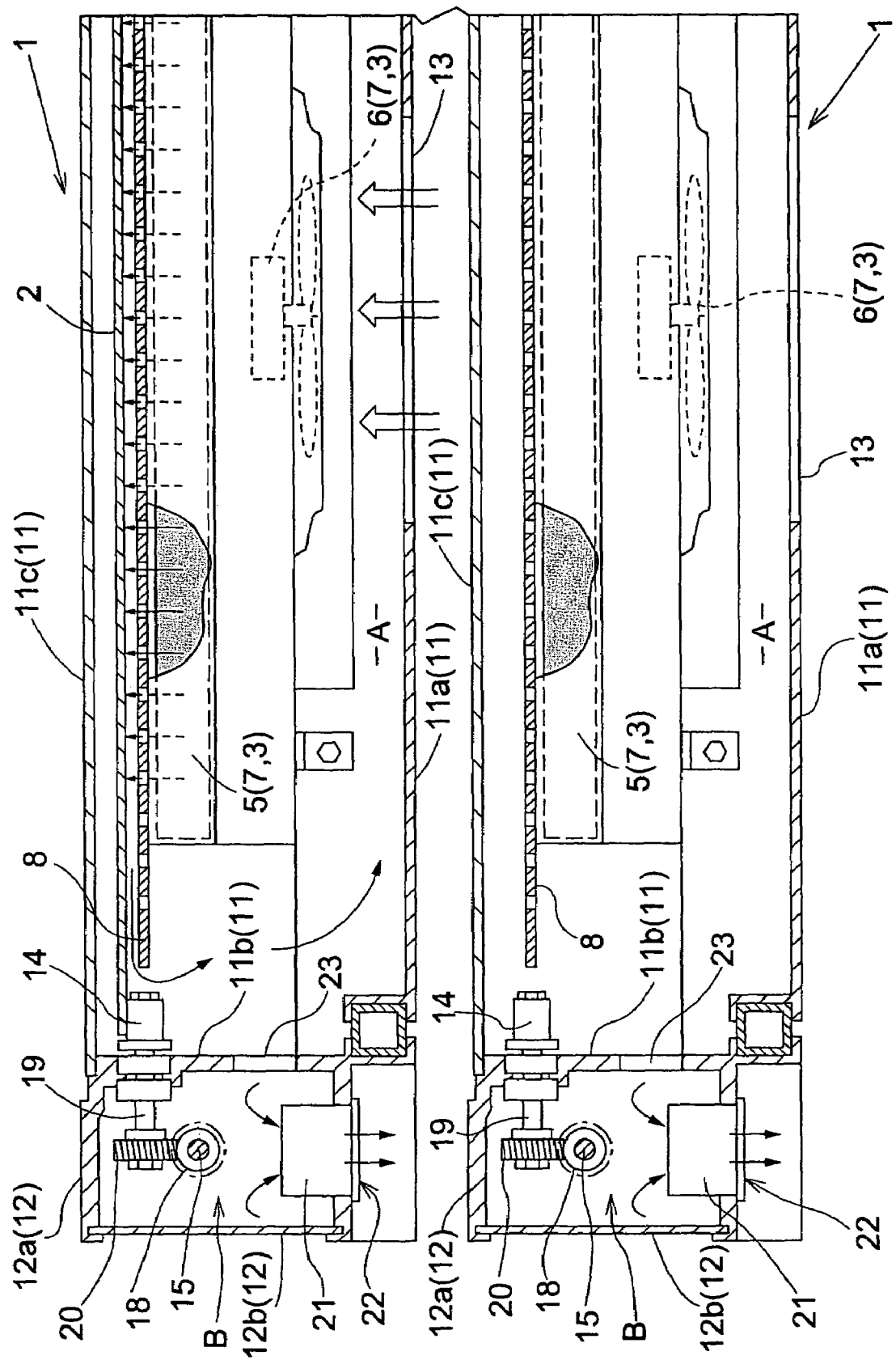
FIG. 3 is a partially magnified vertical front sectional view of the transporting apparatus according to the first embodiment.

As shown in FIGS. 1 to 3, the transporting units 1 are provided lined up adjacent to one another in the transporting direction of the glass substrate 2, and the glass substrate 2 is carried by transferring it from the transporting unit 1 positioned upstream in the transporting direction to the transporting unit 1 positioned downstream in the transporting direction.

Also, the transporting units 1 are disposed in two stages in the vertical direction, and the transporting directions of the upper transporting unit 1 and the lower transporting unit 1 can be opposite directions or can be the same direction. For example, if the transporting directions of the upper transporting unit 1 and the lower transporting unit 1 are opposite, then it is possible to return a glass substrate 2 that has been transported by the upper transporting unit 1 over the lower transporting unit 1 so as to perform the same process on the glass substrate 2 or to return defective glass substrates to the source.

As shown in FIGS. 1 to 4, the transporting units 1 are provided with air-supplying-type support means 3 that supplies air toward a lower surface portion of the glass substrate 2 so as to contactlessly support the glass substrate 2, and drive force application means 4 that applies a drive force in the transporting direction to the glass substrate 2 that is supported by the air-supplying-type support means 3.

Figure 11:
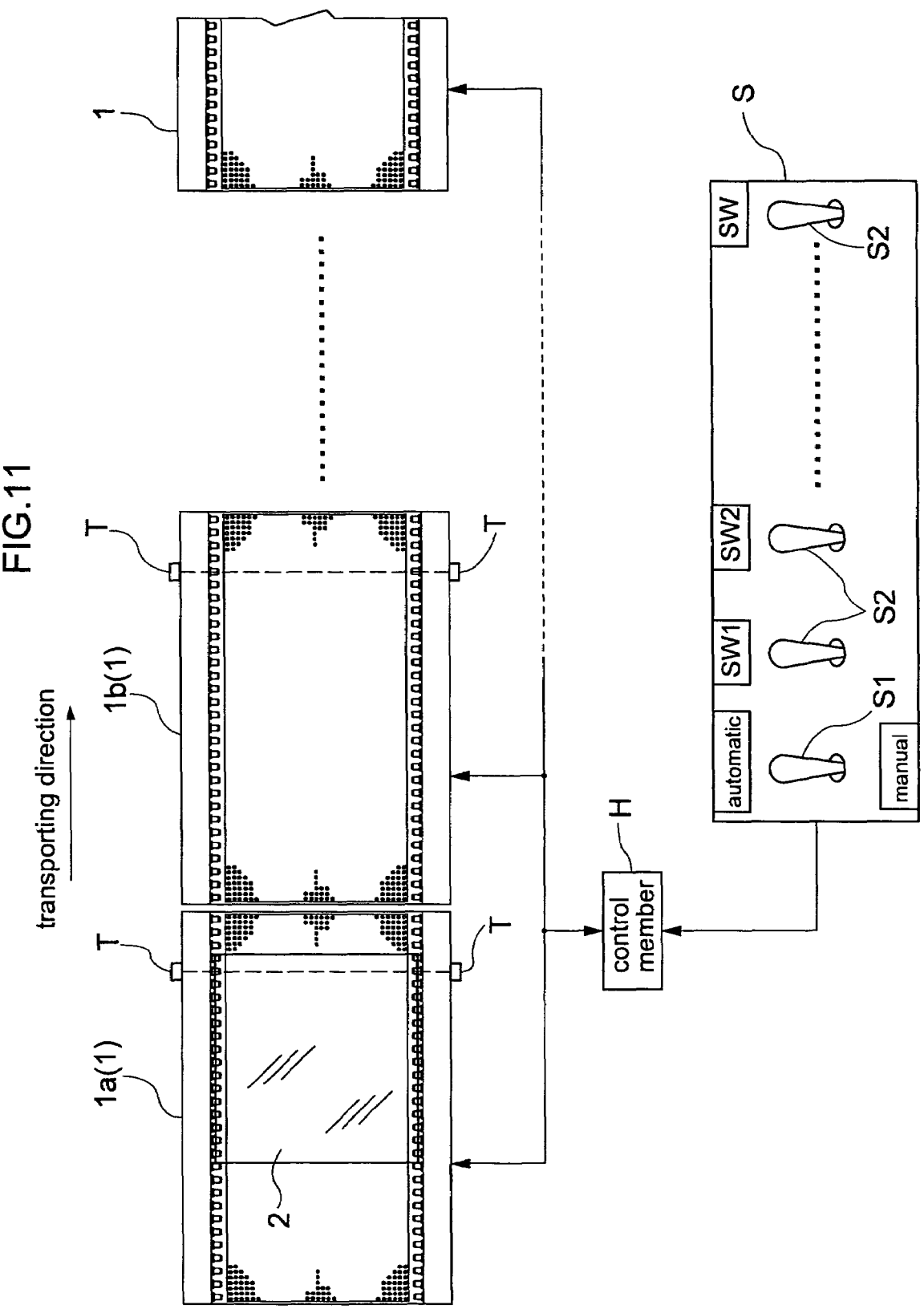
FIG. 11 is a diagram that schematically shows the transporting apparatus according to the first embodiment.

Also, as shown in FIG. 11, the transporting unit 1 is provided with a sensor T as detection means for detecting whether the glass substrate 2 is on the transporting route thereof. The sensor T detects the presence of the glass substrate 2 on the transporting route if light emitted by light-emitting member is not received by a light-receiving member, and it detects that the glass substrate 2 is not on the transporting route when light from the light-emitting member is received by the light-receiving member. Furthermore, the number and installation position, for example, of the sensor T can be suitably changed, and any sensor T capable of detecting whether or not the glass substrate 2 on the transporting route can be employed.

Figure 4:
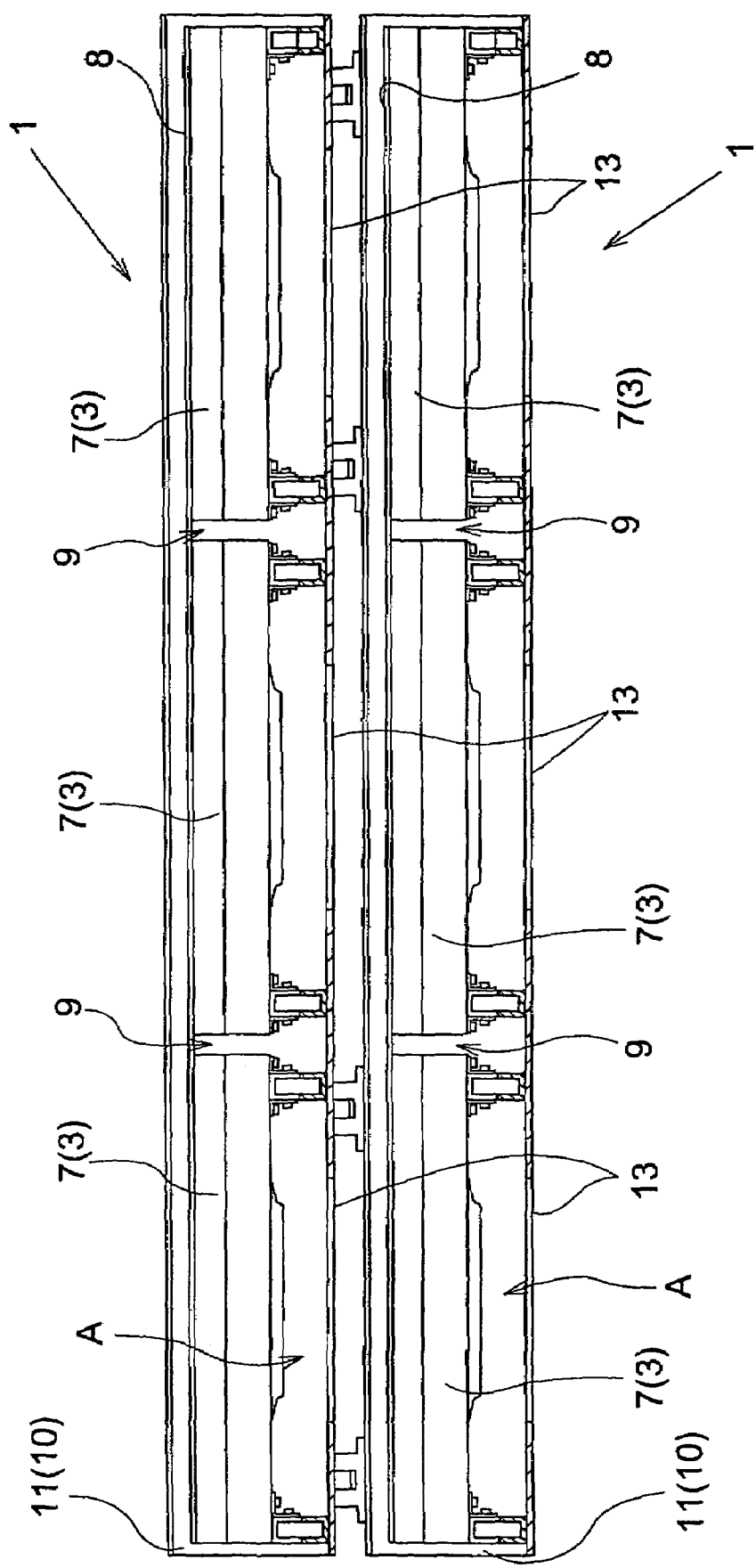
FIG. 4 is a vertical section lateral view of the transporting apparatus according to the first embodiment.
Figure 5:
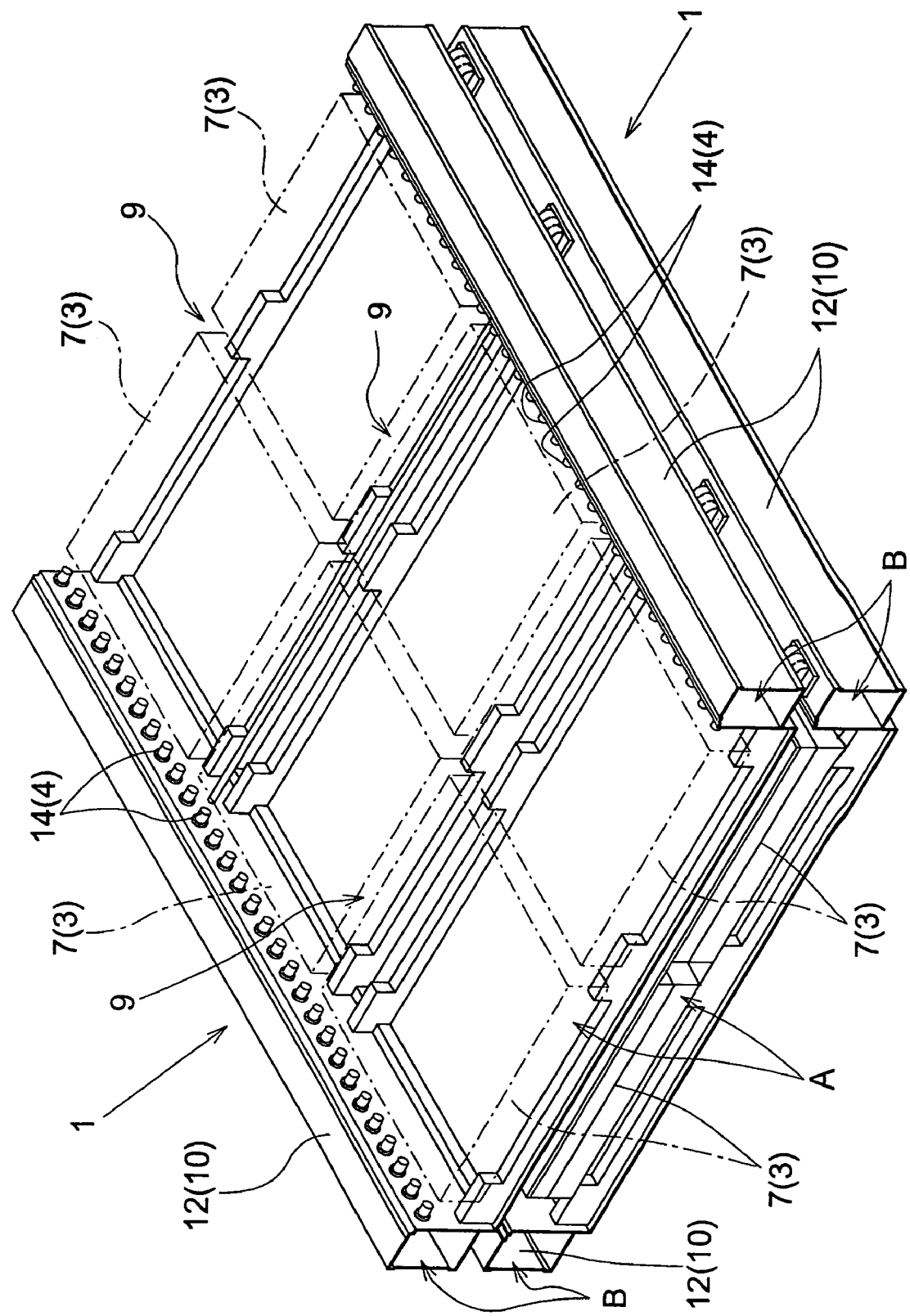
FIG. 5 is a perspective view of a transporting unit according to the first embodiment.
Figure 6:
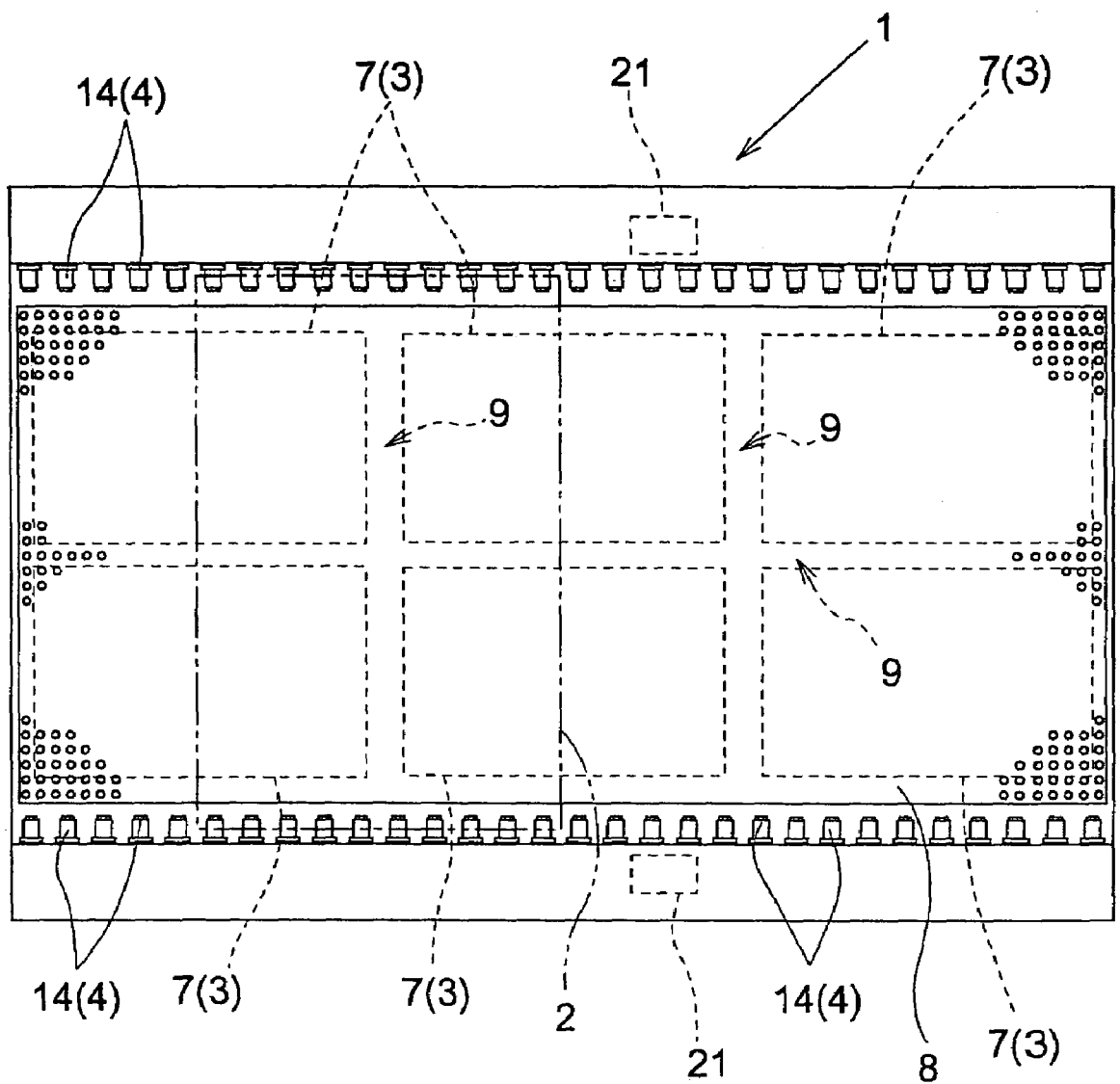
FIG. 6 is a plan view of the transporting unit according to the first embodiment.

As shown in FIGS. 2 to 4, the air-supplying-type support means 3 is provided with a dust removal filter 5 for removing dust, and a blower fan 6 for blowing purified air toward the lower surface portion of the glass substrate 2 through the dust removal filter 5. The air-supplying-type support means 3 is made of a plurality of fan filter units 7, each incorporating a single dust removal filter 5 and a single blower fan 6 in an integral unit, and a porous plate-shaped air rectifying plate 8 for rectifying the flow of the purified air blown toward the lower surface portion of the glass substrate 2 that is provided above the plurality of fan filter units 7. In this context, "rectifying" means to uniformly spread the supplied air over a wide area. The dust filter 5, the blower fan 6 and the air rectifying plate 8 are supported on a housing. More specifically, as shown in FIG. 5 and FIG. 6, one fan filter unit 7 each is arranged on the left and right sides with a spacing between them at an intermediate position in the width direction, which is perpendicular to the transporting direction of the glass substrate 2, and moreover, three fan filter units 7 are provided in a line, with a spacing between them in the transporting direction of the glass substrate 2, for example, for a total of six fan filter units 7.

Thus, a single transporting unit 1 is provided with a air-supplying-type support means 3 made of six fan filter units 7, and a single air rectifying plate 8 is disposed such that it covers the area above the six fan filter units 7.

As shown in FIG. 2 and FIG. 3, the blower fans 6 are configured such that they suck in air from below the spot where they have been arranged and blow that air toward the dust removal filters 5 positioned above them.

In this manner, the air-supplying-type support means 3 is configured such that it supplies purified air that has passed through the dust removal filter 5 and been rectified by the air rectifying plate 8 toward an intermediate portion between both end portions in the width direction, which is perpendicular to the transporting direction of the glass substrate 2, thereby contactlessly supporting the intermediate portion in the width direction of the glass substrate 2.

In the transporting unit 1, as described in FIG. 2 and FIGS. 4 to 6, ventilation paths 9 for discharging the purified air downward are formed at intermediate positions in the width direction, which is perpendicular to the transporting direction of the glass substrate 2, and at positions separated by a spacing in the center in the transporting direction of the glass substrate 2. More specifically, because gaps are provided between the six fan filter units 7, these gaps are employed to form ventilation paths 9 extending in the thickness direction of the fan filter units 7, that are in communication with one another. Aperture portions are formed in the air rectifying plate 8 at positions above the ventilation paths 9, and the ventilation paths 9 guide purified air that has been supplied through the aperture portions downward and discharge the purified air downward. In this way, by providing the ventilation paths 9 in intermediate positions in the width direction, which is perpendicular to the transporting direction of the glass substrate 2, and in positions separated by a spacing in the center in the transporting direction of the glass substrate 2, the purified air does not accumulate at intermediate positions in the width direction of the glass substrate 2 or in the center in the transporting direction and is discharged downward through the ventilation paths 9. And, because the purified air does not accumulate, the glass substrates 2 can be transported in a horizontal or substantially horizontal orientation without being bent upward.

Figure 7:
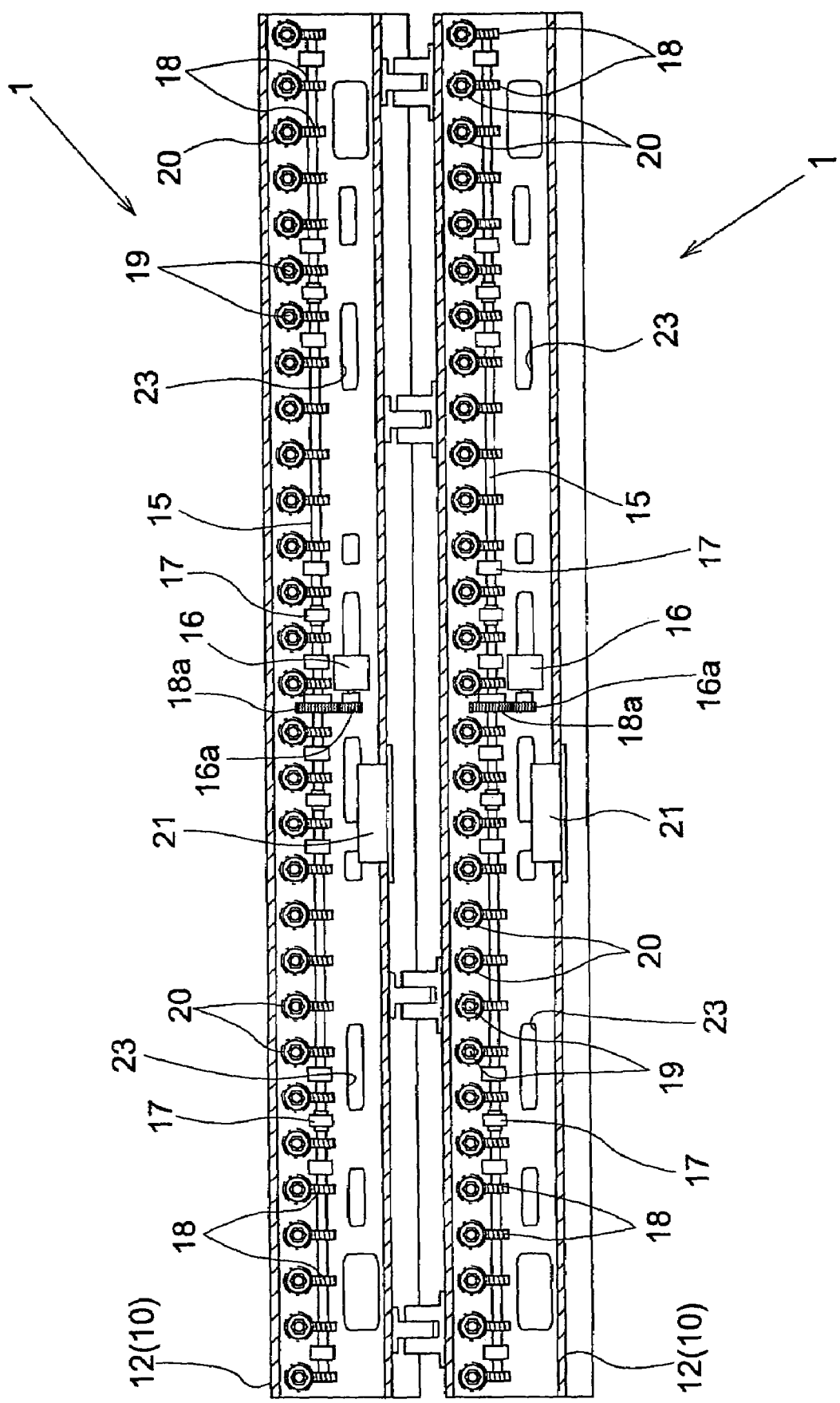
FIG. 7 is a vertical section lateral view of the transporting apparatus, showing a drive force application means, according to the first embodiment.

The drive force application means 3, as shown in FIG. 2 and FIG. 7, is made of drive rollers 14 for supporting both ends of the glass substrate 2 in the width direction in a contacting manner, and an electric motor 16 for driving the drive rollers 14 via power transmission shafts 15. FIG. 7 is a vertical section of a lateral view of the transporting unit 1 showing one side of the drive force application means 3 provided as a left and right pair.

Figure 8:
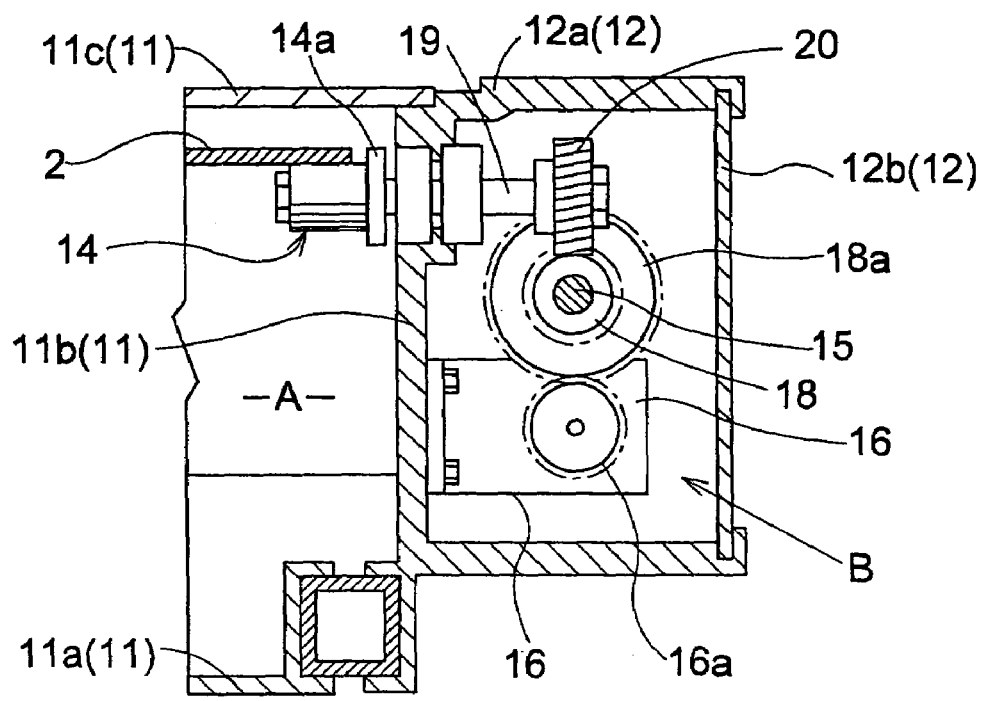
FIG. 8 is a vertical section front view showing the primary components of the drive force application means according to the first embodiment.
Figure 9:
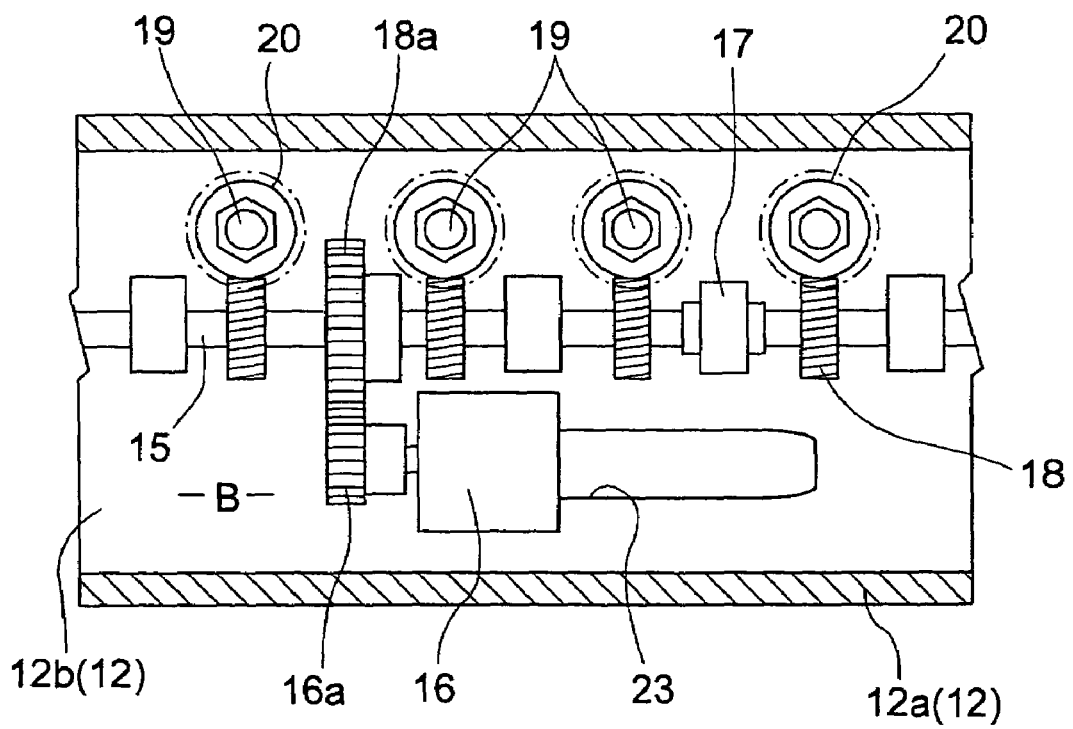
FIG. 9 is a vertical section lateral view showing the primary components of the drive force application means according to the first embodiment.

More specifically, a plurality of drive rollers 14 are provided with a spacing between them in the transporting direction of the glass substrate 2, and the power transmission shafts 15 are lined up in the transporting direction and connectively linked by a plurality of couplings 17. The electric motor 16 is provided such that its output gear 16*a* meshes with a spur gear 18*a* provided on the power transmission shafts 15, and the transmission shafts 15 are rotatively driven by the action of the electric motor 16. Output shafts 19 are provided at positions in the transporting direction of the glass substrate 2 corresponding to the positions where the plurality of drive rollers 14 are disposed, and as shown in FIG. 8 and FIG. 9, the drive rollers 14 are disposed on one end of the output shafts 19. The drive rollers 14 are provided such that they rotate as a single unit with the output shafts 19, and input gears 20 that mesh with the spur gears 18 provided on the power transmission shafts 15 are provided on the other end portion of the output shafts 19.

In this manner, the drive force application means is configured such that the power transmission shafts 15 are rotatively driven by the action of the electric motor 16, and by rotatively driving the power transmission shafts 15, the spur gears 18 on the power transmission shafts 15 and the input gears 20 mesh with one another and rotate the output shafts 19, thereby rotating the drive rollers 14. Also, the drive rollers 14 are rotated by the action of the electric motor 16, and due to the drive rollers 14, both end portions in the width direction of the glass substrate 2 are supported in a contacting manner while a drive force is applied in the transporting direction to the glass substrate 2. A large diameter portion 14*a* of the drive rollers 14 restricts positional displacement in the width direction of the glass substrate 2.

As shown in FIG. 3 and FIG. 4, a frame member 10 of the transporting unit 1 is made of an elongate unit frame member 11 on which the plurality of fan filter units 7 are placed and supported, and a pair of left and right accommodation frame members 12 disposed on either side of the unit frame member 11.

The unit frame member 11 is made of a flat bottom surface member 11*a* arranged on the bottom side, lateral wall portions 11*b* linked to both end portions of the bottom surface member 11*a* and orientated upward, and a unit cover member 11*c* that covers the area above the space between the lateral wall portions 11*b*. The lateral wall portions 11*b* are shared with an accommodation frame member 12.

The space within the unit frame member 11 functions as a transport space A accommodating the glass substrate 2 and the air-supplying-type support means 3 made of the plurality of fan filter units 7, and the unit frame member 11 is configured such that the transport space A is covered in an airtight or substantially airtight state. An air introduction opening 13 for introducing outside air to the transport space A is formed in the bottom surface member 11*a* at a spot located below the blower fan 6. The action of the blower fan 6 sucks in the air of the transport space A and passes the air that has been sucked in through the dust removal filter 5 and the air rectifying plate 8 to supply purified air toward the lower surface portion of the glass substrate 2, and thereby circulating the air within the transport space A. The action of the blower fan 6 introduces outside air into the transport space A through the air introduction opening 13 to increase the pressure within the transport space A and discharge some the air circulating within the transport space A to the outside through for example the gap between the unit frame member 11 and the accommodation frame member 12, thereby exchanging some of the air circulating within the transport space A with outside air.

The accommodation frame member 12 has an accommodation frame 12*a* that is formed bracket-shaped when viewed from the side, and an accommodation cover member 12*b* that closes an open portion in the side of the accommodation frame 12*a*. The space within the accommodation frame member 12 functions as an accommodation space B for accommodating the drive mechanisms such as the electric motor 16 and the drive transmission shafts 15, and the accommodation frame member 12 is configured such that the accommodation space B is covered in an airtight or substantially airtight state. A sub-fan-filter unit 21 that like the fan filter units 7 is provided with a air-supplying function and a dust removal mechanism is provided in the accommodation space B. An outside discharge opening 22 for discharging air within the accommodation space B to the outside is formed in the lower surface portion of the accommodation frame 12a at the spot where the sub-fan-filter unit 21 is arranged in the transporting direction of the glass substrate 2, and an air discharge opening 23 that allows the transport space A and the accommodation space B to communicate with one another is formed in a lateral surface portion of the accommodation frame 12a.

Thus, due to action of the sub-fan-filter unit 21, some of the air in the transport space A is discharged into the accommodation space B, the air in the accommodation space B is sucked in due to the action of the sub-fan-filter unit 21, and air from which dust has been removed by the sub-fan-filter unit 21 is discharged to the outside through the outside discharge opening 22.

The transporting units 1 are disposed in two stages in the vertical direction, and as shown in FIG. 2, the upper-side transporting unit 1 is configured such that it can be swingably operated upward about one end side of the lateral side portion so as to open up the space above the lower-side transporting unit 1. That is, the frame member 10 of the upper-side transporting unit 1 is supported such that it can freely pivot about a swing axis P, and by swinging upwards it can open the area above the frame member 10 of the lower transporting unit 1. Also, to perform maintenance on the lower transporting unit 1, the upper transporting unit 1 is swingably operated and then the cover member 11c is removed from the frame member 10 of the lower transporting unit 1 to allow the transport space A of the lower transporting unit 1 to be opened. To perform maintenance on the upper transporting unit 1, the cover member 11c can be removed to open the transport space A of the upper transporting unit 1. To perform maintenance on the accommodation space B of the transporting unit 1, the accommodation cover member 12b of the accommodation frame member 12 in either the upper transporting unit 1 or the lower transporting unit 1 can be removed to open up the accommodation space B.

Figure 10:
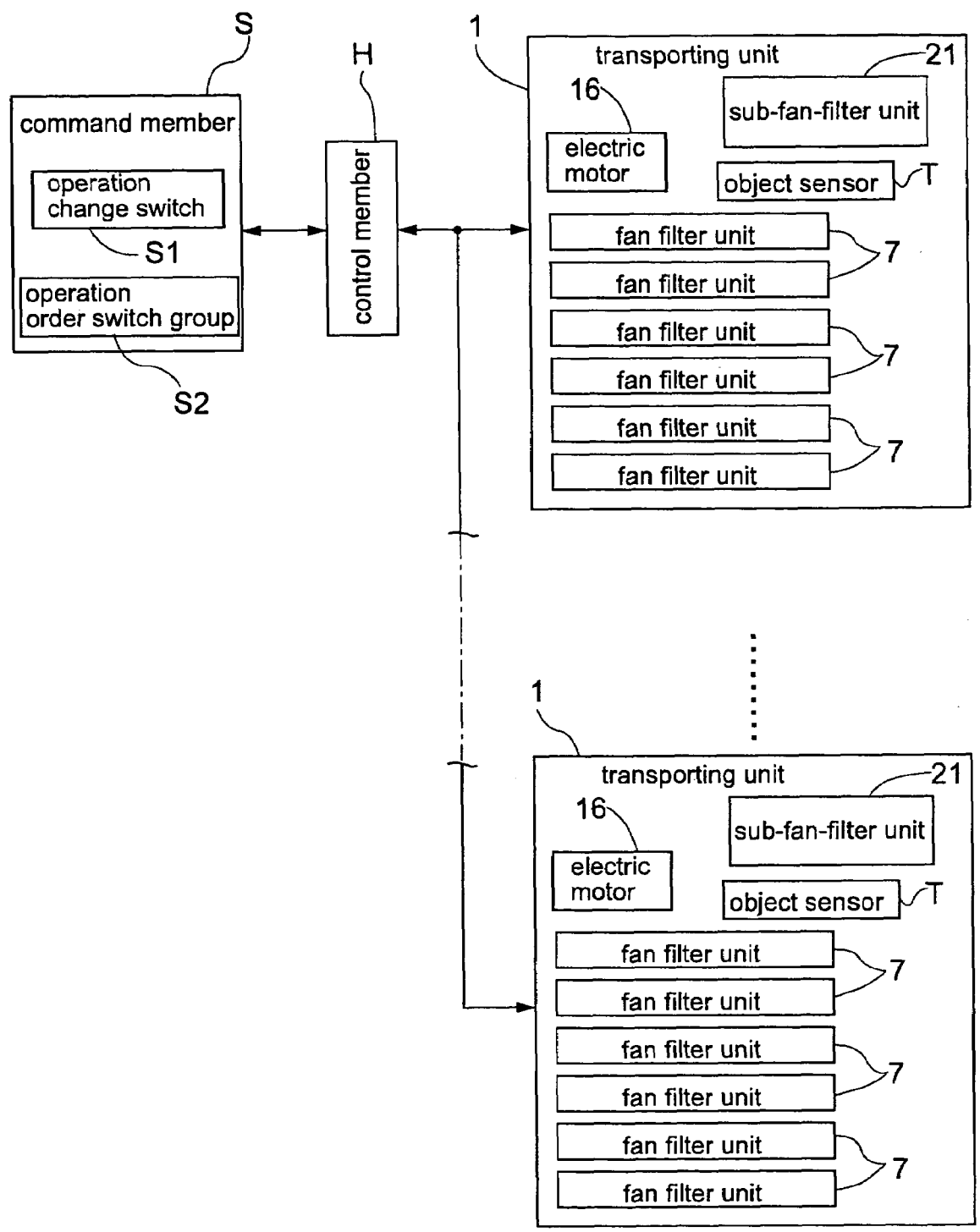
FIG. 10 is a control block diagram of the transporting apparatus according to the first embodiment.

As shown in FIG. 10, a control member H controls the starting and stopping of operation of each of the plurality of the transporting units 1 based on commands from the command member S. More specifically, the control member H starts operation of the transporting units 1 by starting actuation of the electric motors 16, the fan filter units 7, and the sub-fan-filter unit 21. Conversely, the control member H stops operation of the transporting units 1 by stopping actuation of the electric motor 16, the fan filter units 7 and the sub-fan-filter unit 21. The control member H is configured such that the glass substrate 2 is contactlessly supported and transported when the transporting units 1 are in the operating state.

The command member S is provided with a manually operated operation change switch S1 for switching between automatic operation and manual operation, and a manually operated operation order switch group S2 for separately ordering the start and stop of operation of the plurality of transporting units 1 during manual operation. As shown in FIG. 11, the operation order switch group S2 is provided with the same number of operation order switches as the number of transporting units 1 lined up in the transporting direction, and each operation order switch corresponds to a single transporting unit 1.

Further, when the control member H receives an order for automatic operation from the operation change switch S1, the control member H assumes all transporting units 1 are to be operated and activates the electric motors 16 and the sub-fan-filter units 21 as well as activates the blow fan 6 such that the amount of air that is blown toward the lower surface portion of the glass substrate 2 becomes a support air amount.

In this manner, during automatic operation the control member H operates all transporting units 1 so as to transfer the glass substrate 2 from the transporting unit 1 positioned upstream in the transporting direction to the transporting unit 1 positioned downstream in the transporting direction while transporting the glass substrate 2 from the upstream end portion to the downstream end portion.

With regards to the operation of the control member H during automatic operation, it is also possible to control the plurality of the transporting units 1 such that only some of the plurality of transporting units are simultaneously in the operating state. If the plurality of the transporting units 1 are controlled such that only some of the plurality of transporting units 1 are simultaneously in the operating state, then, for example, it is possible to select which transporting unit 1 to start and which transporting unit 1 to stop depending on which transporting unit 1 transporting route the glass substrate 2 is on based on information detected by the sensor T, and then to start and stop operation of the selected transporting units 1.

Also, the control member H is configured such that, when manual operation is ordered by the operation change switch S1, the electric motor 16, the sub-fan-filter unit 21 and the blower fans 6 of only the transporting units 1 that are ordered to start operating by the operation order switch group S2 are operated. In this manner, during manual operation only those transporting units 1 ordered to operate by the operation order switch group S2 are operated, and the glass substrate 2 is contactlessly supported on and transported by those transporting units 1 that are operated.

Also, during manual operation, the control member H does not simply start operation of the transporting unit 1 ordered to start operating by the operation order switch group S2, but rather starts operation only if the transporting unit 1 adjacent on the downstream side in the transporting direction can contactlessly support and carry the substrate glass 2 that is to be transferred thereto based on whether or not the transporting unit 1 adjacent on the downstream side in the transporting direction is in an operating state. Consequently, in the first embodiment, the state of the transporting unit 1 on the upstream side is controlled based on the transporting state (operating state) of the transporting unit 1 on the downstream side.

There are a number of methods for determining whether a specific transporting means is in the operating state. For example, when an instruction has been made to start operation of a specific transporting means, that is, when the operation order switch is on, or when an operation start instruction has been performed by the control member H using some other method, then this can be used to determine that the transporting means to which the operation start signal has been sent is in an operating state. It is also possible to determine that a transporting means is in an operating state based on signals from sensors provided in the air-supplying-type support means 3 and the drive force application means 4. Sensors known to those skilled in the art, such as a sensor for sensing rotation of the blower fan 6, or a rotation sensor provided near the electric motor 16, can be employed as such sensors.

If the transporting unit 1 adjacent on the downstream side in the transporting direction is in the operating state, then the control member H allows the transporting unit 1 upstream thereof to start operation when an order to start operating is made by the operation order switch group S2. However, if the transporting unit 1 adjacent on the downstream side in the transporting direction is in the non-operating state, then the control member H does not allow operation of the upstream transporting unit 1 to start even if an order to start operation has been made by the operation order switch group S2.

Also, the control member does not simply prohibit the start of operation of a transporting unit 1 for which the adjacent one on the downstream side in the transporting direction is in the non-operating state. But it preferably prohibits the start of operation of a up-stream side transporting unit 1 for which the adjacent one on the downstream side in the transporting direction is in the non-operating state if the sensor T detects the presence of the glass substrate 2. To explain this in greater detail, because there is no transporting unit 1 adjacent downstream in the transporting direction to the transporting unit 1 positioned on the most downstream side in the transporting direction, if operation start is ordered by the group of operation order switches S2, then the control member H unconditionally starts operation when a command to start operation has been made by the operation order switch group S2.

Further, as regards the transporting units 1 other than the transporting unit 1 positioned on the most downstream side in the transporting direction, the control member H starts operation when a command to start operation has been made by the operation order switch group S2 as long as the sensor T does not detect the presence of the glass substrate 2, regardless of whether the transporting unit 1 adjacent on the downstream side in the transporting direction is in the operating state.

The control member H does not allow operation to start, even if a command to start operation has been made by the operation order switch group S2, when the transporting unit 1 adjacent on the downstream side in the transporting direction is in the non-operating state and the sensor T of the transporting unit 1 adjacent on the upstream side detects the glass substrate 2.

Figure 12:
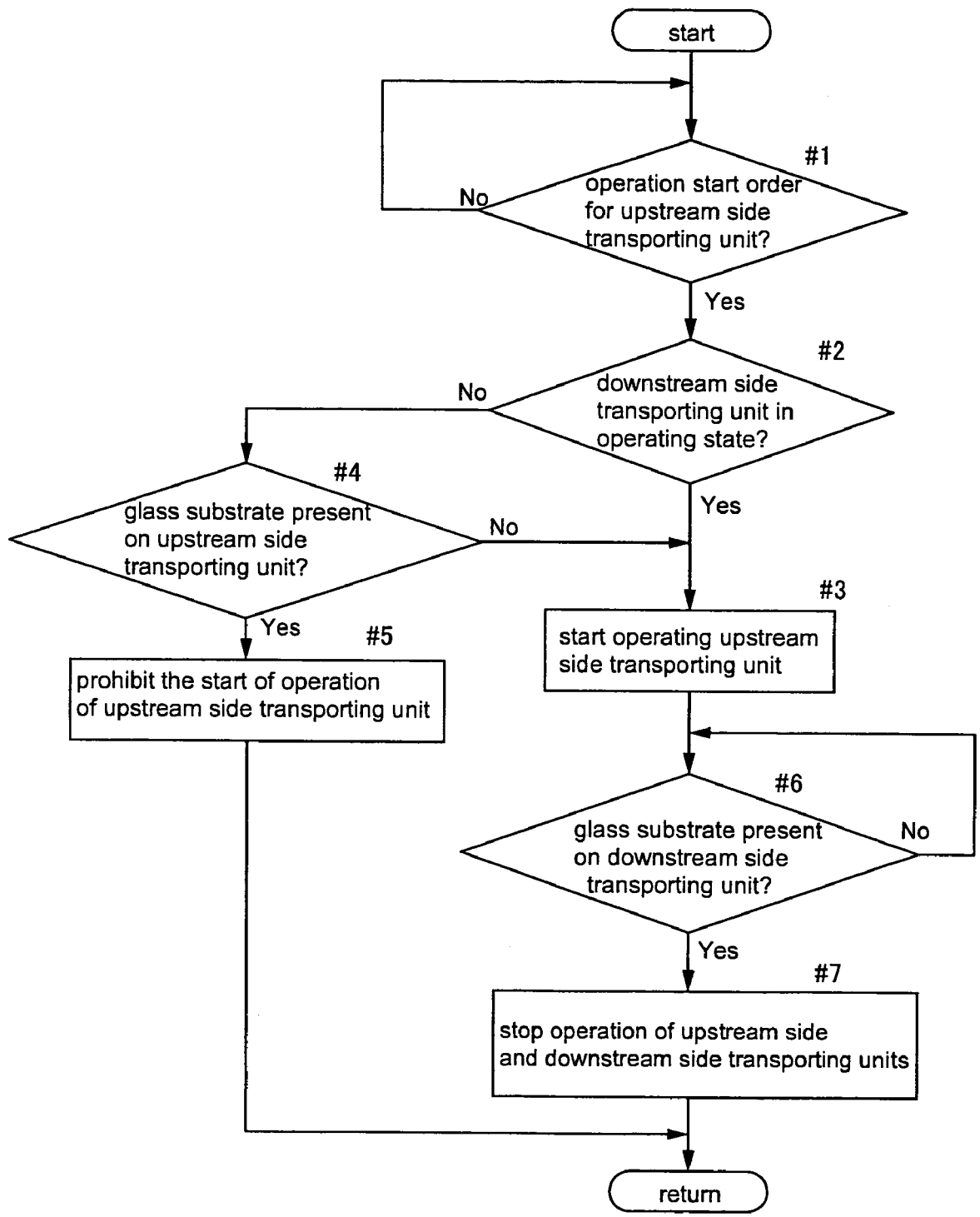
FIG. 12 is a flowchart of a manual operation according to the first embodiment.

The starting and stopping of operation of the transporting units 1 other than the transporting unit 1 positioned on the most downstream side in the transporting direction are the same for all transporting units 1, and thus, as shown in FIG. 11, two specific transporting units 1 of the plurality of transporting units 1 lined up in the transporting direction will be considered next and described with reference to the flowchart in FIG. 12. In FIG. 11, description is made with the transporting unit 1 on the upstream side in the transporting direction defined as an upstream side transporting unit 1a and the transporting unit 1 on the downstream side in the transporting direction defined as a downstream side transporting unit 1b, and of the operation switch types S2, and the operation order switch for ordering the start of operation of the upstream side transporting unit 1a is defined as an operation order switch SW1 and the operation order switch for ordering the start of operation of the downstream side transporting unit 1b is defined as the operation order switch SW2.

First, when the upstream side transporting unit 1a is ordered to start operating by the operation order switch SW1, the control member H determines whether or not the downstream side transporting unit 1b is in the operating state, and when the downstream side transporting unit 1b is in the operating state, the control member H starts operation of the upstream side transporting unit 1a (steps 1 to 3).

Then, when the downstream side transporting unit 1b is in the non-operating state and the sensor T in the upstream side transporting unit 1a detects the presence of the glass substrate 2, the control member H prohibits the start of operation of the upstream side transporting unit 1a (steps 2, 4 and 5).

The control member H starts operation of the upstream side transporting unit 1a even if the downstream side transporting unit 1b is in the non-operating state as long as the sensor T in the upstream side transporting unit 1a does not detect the glass substrate 2 (steps 2, 4 and 3).

When operation of the upstream side transporting unit 1a has been started and the sensor T in the downstream side transporting unit 1b detects the glass substrate 2, the control member H stops operation of the upstream side transporting unit 1a and the downstream side transporting unit 1b (steps 6 and 7).

Second Embodiment

The control member H according to a separate embodiment is described next. With the exception of the control member H that is described below, the structure of the transporting apparatus itself is the same as that set forth in the first embodiment, and thus a detailed explanation thereof is omitted in this embodiment.

As shown in FIG. 10, the control member H of this embodiment as well controls the operation of each of the plurality of transporting units 1 based on a command from the command member S. When a transporting unit 1 is in the operating state, the control member H actuates the electric motor 16, the fan filter units 7 and the sub-fan-filter unit 21 to contactlessly support and carry the glass substrate 2.

The fan filter units 7 are configured such that by switching the operating state of the blower fan 6, the amount of purified air blown toward the lower surface portion of the glass substrate 2 can be switched between a supporting operation state in which the air amount is a supporting air amount for contactlessly supporting the glass substrate 2, and a weak air state in which the air amount is a small set air amount that is smaller than the supporting air amount.

That is to say, the air-supplying-type support means 3 made of a plurality of fan filter units 7 is configured such that it supplies purified air toward the lower surface portion of the glass substrate 2 through the dust removal filter 5, and such that can be changed between the supporting operation state and the weak air state.

When operating the plurality of transporting units 1, the control member H controls the operating state of the air-supplying-type support means 3 of the transfer transporting unit 1 to which the glass substrate 2 is to be transferred such that the glass substrate 2 can be contactlessly supported by the air-supplying-type support means 3 prior to the transfer timing of the glass substrate 2. Consequently, in this second embodiment, the state of the downstream side transporting unit 1 is controlled in accordance with the transporting state of the upstream side transporting unit 1. Here, the point at which the electric motor 16 of the transporting unit 1 to which transfer is to be made is operated, so that the glass substrate 2 can be transferred to that transporting unit 1, is defined as the transfer timing.

In other words, the control member H operates the air-supplying-type support means 3 at the weak air state, and for the transporting unit 1 to which transfer is to be made, changes the air-supplying-type support means 3 from the weak air state to the supporting operation state before the transfer timing. More preferably, the control member H, for the transporting unit 1 to which transfer is to be made, changes the state of the air-supplying-type support means 3 from the weak air state to the supporting operation state at an upstream transfer timing, at which the glass substrate 2 is transferred to a transporting unit 1 which is adjacent and is upstream in the transporting direction of the transporting unit 1 to which transfer is to be made, so that the transition is made to a state where the air-supplying-type support means 3 can contactlessly support the glass substrate 2. Here, the time at which the electric motor 16 of the upstream side transporting unit 1 is activated such that the glass substrate 2 is transferred to the transporting unit 1 adjacent upstream in the transporting direction of the transporting unit 1 to which transfer is to be made is detected as the upstream transfer timing. The upstream transfer timing is set such that by changing the air-supplying-type support means 3 from the weak air state to the supporting operation state at the upstream transfer timing based on the time required to change the operating state of the air-supplying-type support means 3 or the transporting speed of the glass substrate 2, for example, it is possible for the transporting unit 1 to which transfer is to be made to contactlessly support the glass substrate 2 to be transferred.

The operation of the fan filter units 7 and the electric motor 16 during control of the plurality of transporting units 1 by the control member H is described in greater detail below.

First, the control member H operates the fan filter units 7 of all of the plurality of transporting units 1 lined up in the transporting direction at the weak air state. Then, the control member H changes the operating state of the transporting unit 1 to which transfer is to be made at the upstream transfer timing, which is prior to the transfer timing, such that the fan filter units 7 are switched from the weak air state to the supporting operation state, and also activates the electric motors 16 of the transporting unit 1 on whose transporting route the substrate 2 is present and the transporting unit 1 positioned one downstream from that transporting unit 1.

In this manner, the transporting unit 1 to which transfer is to be made is capable of contactlessly supporting the glass substrate 2 by the air-supplying-type support means 3 at the upstream transfer timing, which is before the transfer timing at which the glass substrate 2 is actually transferred, and thus the glass substrate 2 is transferred and transported between transporting units 1 while the glass substrate 2 is contactlessly supported by the air-supplying-type support means 3.

The upstream transfer timing is also defined as the timing at which the operation of the electric motors 16 is started such that the glass substrate 2 is transferred to the transporting unit 1 adjacent upstream in the transporting direction of the transporting unit 1 to which transfer is to be made.

Further, when operation start is initially ordered by the command member S, the control member H activates the fan filter units 7 of the transporting unit 1 positioned most upstream in the transporting direction and the transporting unit 1 positioned one downstream therefrom at the supporting operation state, and activates the fan filter units 7 of the other transporting units 1 at the weak air state.

In this operating state, the glass substrate 2 is placed on the transporting route of the transporting unit to which transfer is to be made, which is positioned on the most upstream side in the transporting direction, by a loading device, thereby introducing the glass substrate 2 into the transporting apparatus.

Then, when the glass substrate 2 has been introduced, the control member H detects that the glass substrate 2 is on the transporting route of the transporting unit 1 positioned on the most upstream side in the transporting direction based on the detection information of the object sensor T, after which it activates the electric motors 16 of the transporting unit 1 positioned on the most upstream side in the transporting direction and the transporting unit 1 that is positioned one downstream from that transporting unit 1, transferring the glass substrate 2 from the transporting unit 1 positioned on the most upstream side in the transporting direction to the transporting unit 1 that is positioned one downstream from that transporting unit 1.

In this fashion, by controlling the operating state of the fan filter units 7 and the electric motors 16, the glass substrate 2 is contactlessly supported and transferred from the transporting unit 1 positioned on the upstream side in the transporting direction to the transporting unit 1 positioned on the downstream side in the transporting direction while the glass substrate 2 is transported from the upstream end portion to the downstream end portion of the transporting apparatus by the plurality of transporting units 1.

Figure 13:
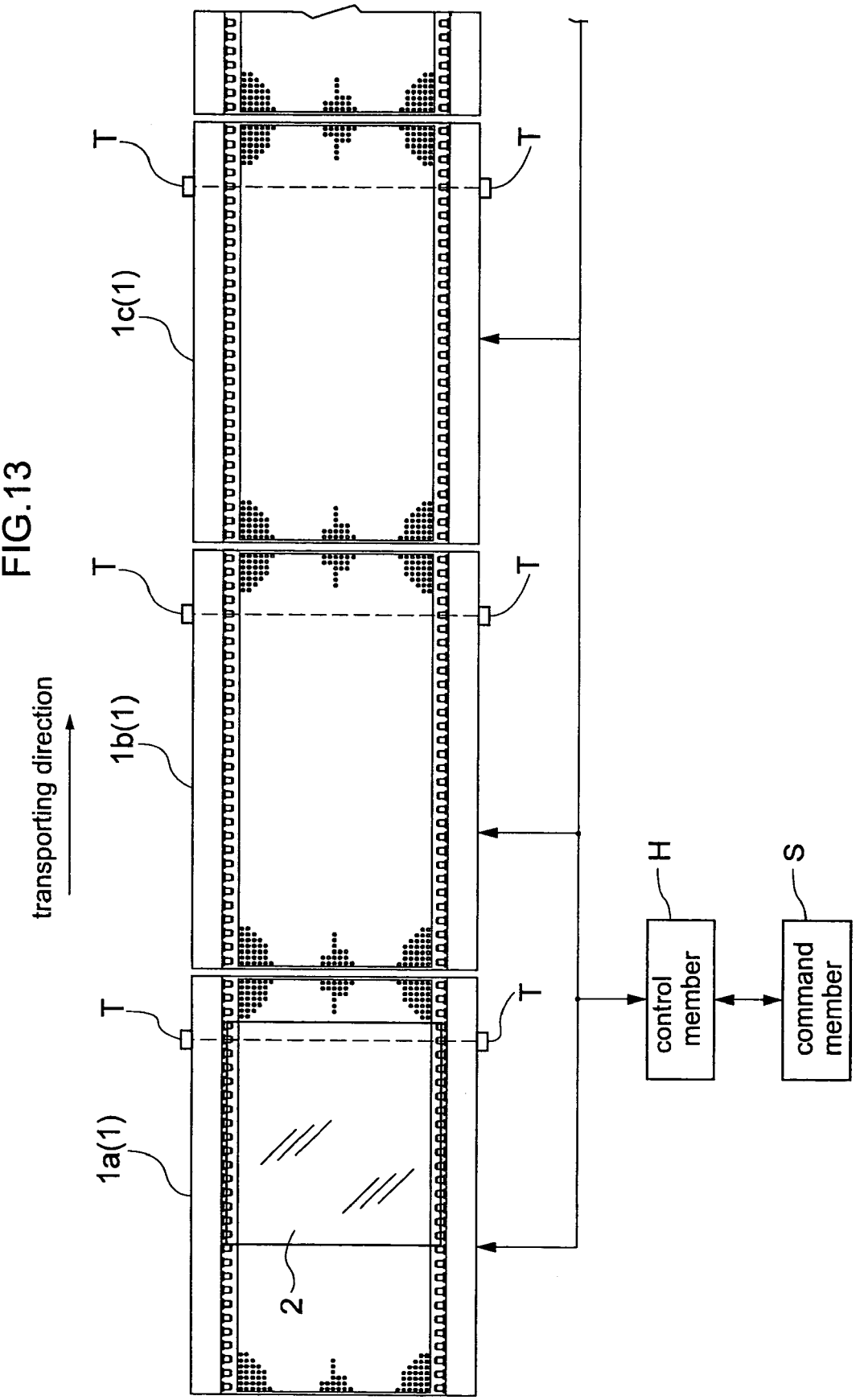
FIG. 13 is a diagram that schematically shows the transporting apparatus according to the second embodiment.
Figure 14:
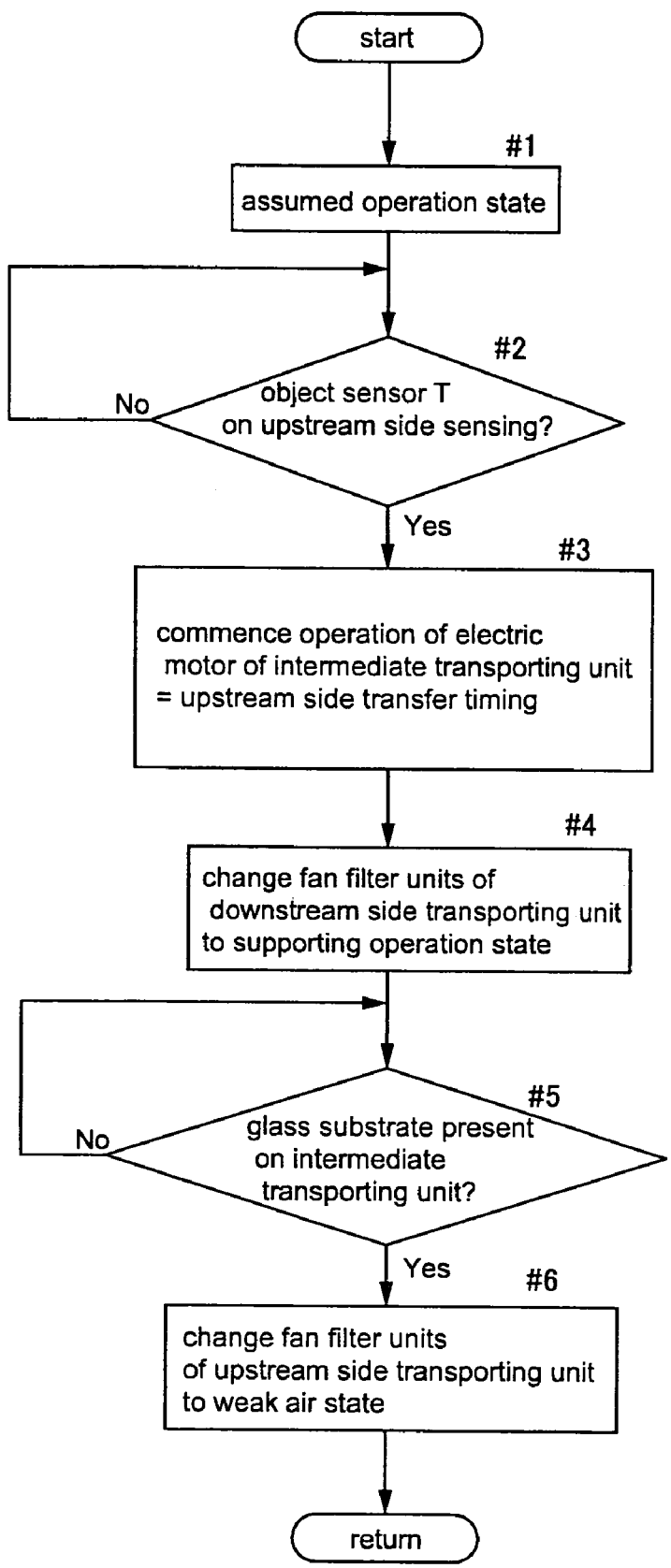
FIG. 14 is a flowchart of the transporting apparatus according to the second embodiment.

Because the fan filter units 7 and the electric motors 16 of all the transporting units 1 are operated in the same manner for all of the plurality of transporting units 1, three specific transporting units 1 of the plurality of transporting units 1 lined up in the transporting direction as shown in FIG. 13 are considered and described in further detail in accordance with the flowchart in FIG. 14. In FIG. 13, the description is made with the transporting unit 1 positioned on the most upstream side in the transporting direction defined as the upstream side transporting unit 1a, the transporting unit 1 positioned one downstream from the upstream side transporting unit 1a defined as an intermediate transporting unit 1b, and the transporting unit 1 positioned one downstream from the intermediate transporting unit 1b defined as a downstream side transporting unit 1c.

First, if the glass substrate 2 is present on the transporting route of the upstream side transporting unit 1a but the glass substrate 2 has not arrived at the position of the object sensor T, then the blower fans 6 of the fan filter units 7 of the upstream side transporting unit 1a are in the supporting operation state and the blower fans 6 of the intermediate transporting unit 1b and the downstream side transporting unit 1c are in the weak air state. This is the assumed operating state (step 1).

Next, when the presence of the glass substrate 2 is detected by the object sensor T in the upstream side transporting unit 1a (step 2), the blower fan 6 of the intermediate transporting unit 1b is also activated at the supporting operation state in addition to the blower fan 6 of the upstream side transporting unit 1a, and the blower fan 6 of the downstream side transporting unit 1c is in the weak air state. Then, the control member H starts operation of the electric motor 16 in the intermediate transporting unit 1b to transfer the glass substrate 2 from the upstream side transporting unit 1a to the intermediate transporting unit 1b (step 3). The upstream transfer timing is detected by starting operation of the electric motor 16 in the intermediate transporting unit 1b, and the fan filter units 7 in the downstream side transporting unit 1c, to which transfer is to be made, is changed from the weak air state to the supporting operation state (step 4). While there may be a gap between the detection of the glass substrate 2 by the object sensor T in step 2 and the start of the electric motor 16 in the intermediate transporting unit 1b in step 3, the electric motor 16 may be started when the object sensor T detects the glass substrate 2.

Thereafter, when the presence of the glass substrate 2 is detected by the intermediate transporting unit 1b by the object detecting sensor T, the control member H changes the state of the fan filter units 7 in the upstream side transporting unit 1a from the supporting operation state to the weak air state (steps 5 and 6).

The operation of the sub-fan-filter units 21 can be suitably altered, such as activating the sub-fan-filter unit 21 of the transporting unit 1 in which the electric motor 16 is in the operating state or activating the sub-fan-filter units 21 of all the transporting units 1.

Third Embodiment

A third embodiment illustrates a separate embodiment of the orientation of the transported object that is transported in the foregoing first and second embodiments, and focusing on this feature the third embodiment is described below in accordance with the drawings. Structural features other than this are identical to those of the first embodiment, and thus by using the same reference numerals a detailed explanation thereof is omitted.

Figure 15:
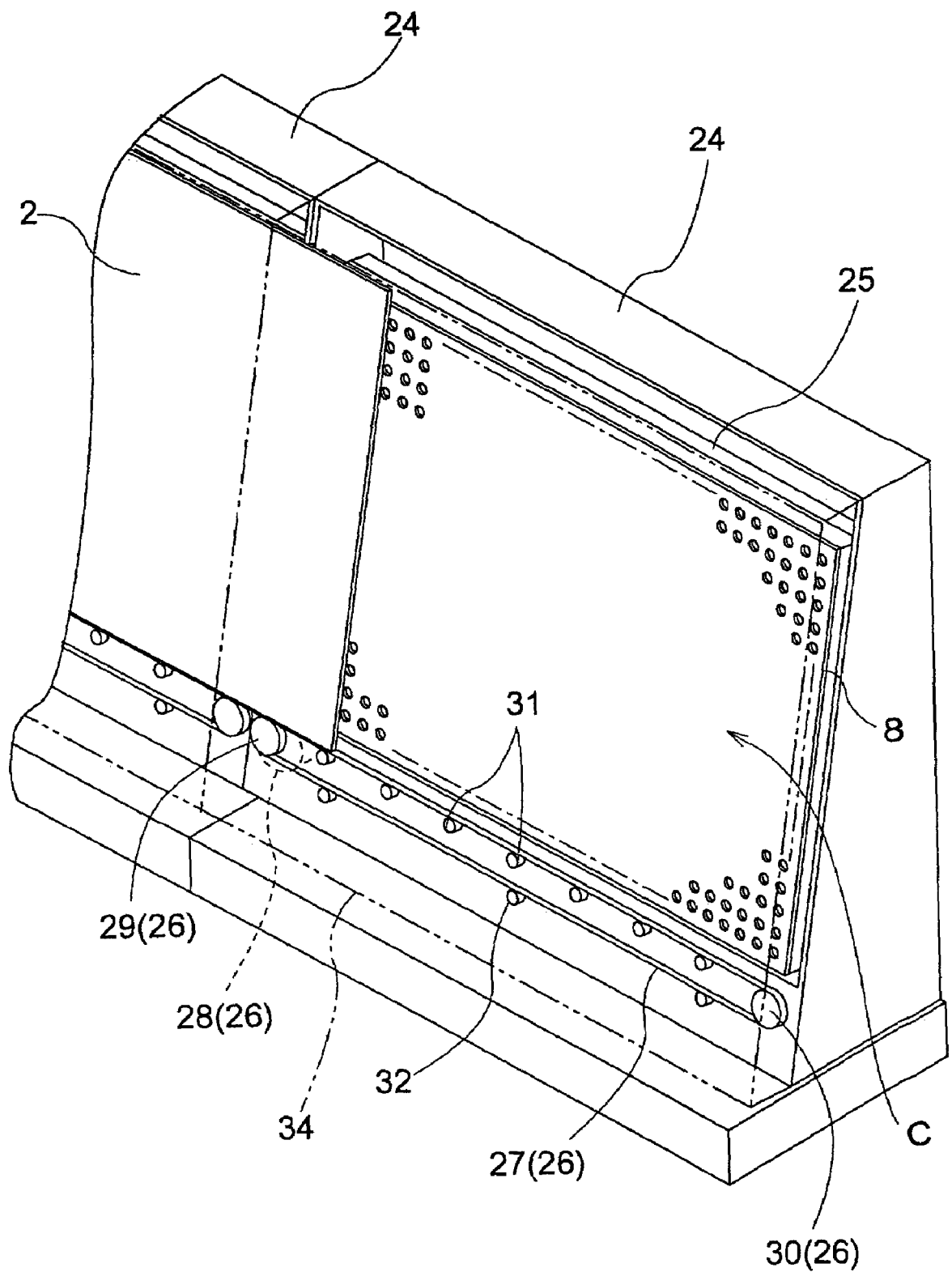
FIG. 15 is a perspective view of a transporting apparatus according to the third embodiment, in which a portion thereof has been omitted.
Figure 16:
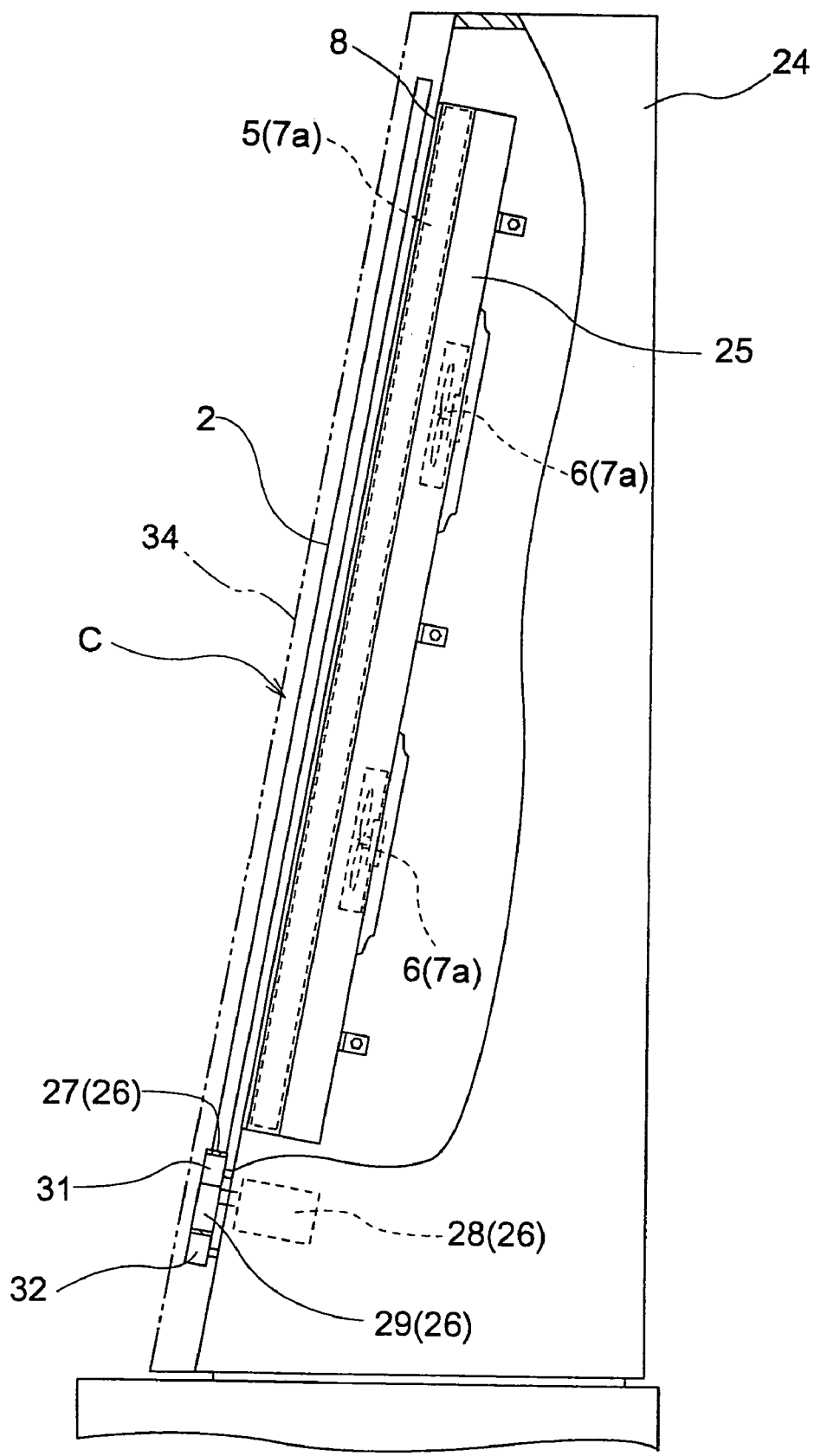
FIG. 16 is a partially omitted lateral view of the transporting apparatus according to the third embodiment.

As shown in FIG. 15 and FIG. 16, a plurality of vertical orientation transporting units 24 are provided lined up in the transporting direction of the glass substrate 2 and function as transporting means for carry a glass substrate 2 serving as the transported object in a vertical or near vertical orientation.

The vertical orientation transporting units 24 are provided with a vertical orientation air-supplying-type support means 25, which is provided in a near vertical orientation, and a vertical orientation drive force application means 26, which is provided in a near vertical orientation.

Incidentally, in this third embodiment of the present invention, the glass substrate 2 is transported in an orientation that is nearly vertical, and thus the side on which the vertical orientation transporting unit 24 is present is the lower surface portion of the glass substrate 2.

The vertical orientation air-supplying-type support means 26 is configured such that purified air is supplied toward the lower surface portion of the glass substrate 2 being transported in a nearly vertical orientation so as to contactlessly support the glass substrate 2.

Incidentally, the vertical orientation air-supplying-type support means 26, like the air-supplying-type support means 3 in the first embodiment, is constituted by fan-filter units 7a in which the dust-removal filter 5 and the blowing fan 6 are incorporated into a single unit, and the fan-filter units 7a are made of two blowing fans 6 arranged vertically and one dust-removal filter 5 incorporated into a single unit.

An air rectifying plate 8 for rectifying purified air from the fan-filter units 7a is also provided.

The vertical orientation drive force application means 26 is provided with a timing belt 27 that applies a drive force while supporting an end portion of the glass substrate 2 in a contacting manner, and thus applies a drive force in the transporting direction to the glass substrate 2.

To describe the vertical orientation drive force application means 26 in further detail, it is provided with a drive shaft 29 that is positioned on the lower transporting side and rotates due to an electric motor 28, a driven shaft 37 that is positioned on the upper transporting side and is capable of rotation, and the timing belt 27, which is wound between the drive shaft 29 and the driven shaft 30.

The timing belt 27 is supported on its forward route portion by inner support shafts 31 from its inner circumferential side, and is supported on its return route portion by outer support shafts 32 from its outer circumferential side.

A transporting case 34 that covers a transport space C, which accommodates the vertical orientation air-supplying-type support means 26 and the carry route of the glass substrate 2, in an airtight or substantially airtight manner is provided.

In the vertical orientation air-supplying-type support means 26, like in the first embodiment, the fan filter units 7a are configured such that they can be switched between a supporting operation state in which the amount of purified air that is blown toward the lower surface portion of the glass substrate 2 is a supporting air amount, and a weak air state in which the amount of purified air that is blown toward the lower surface portion of the glass substrate 2 is a small set air amount.

The control member H, like in the first embodiment, can be configured such that, in accordance with a command from a command member S, it controls the starting and stopping of operation of each of the plurality of vertical orientation transporting units 24 to perform manual operation and automatic operation. The control member H is also configured such that the glass substrate 2 is contactlessly supported and transported by activating the electric motor 28 and the fan filter unit 7a when the vertical orientation transporting units 24 are in the operating state.

Like in the first embodiment, it is possible to adopt a configuration in which the control member H, during manual operation, does not simply start operation of the vertical orientation transporting units 24, which are ordered to start operation by the operation order switch group S2, but rather starts operation only if the vertical orientation transporting unit 24 adjacent on the downstream side in the transporting direction can contactlessly support and carry the glass substrate 2 to be transferred based on whether the vertical orientation transporting unit 24 adjacent on the downstream side in the transporting direction is in the operating state.

In this case, the control member H allows operation the vertical orientation transporting unit 24, with respect to which the vertical orientation transporting unit 24 on the downstream side in the transporting direction is in the operating state, to be started, and prohibits operation of the vertical orientation transporting unit 24, with respect to which the vertical orientation transporting unit 24 on the downstream side in the transporting direction is in the non-operating state, from starting.

Also, the control member H is configured such that operation of the vertical orientation transporting unit 24, with respect to which the vertical orientation transporting unit 24 adjacent on the downstream side in the transporting direction is in the operating state, is started when an operation start command is ordered by operation order switch group S2, and such that operation of the vertical orientation transporting unit 24, with respect to which the vertical orientation transporting unit 24 adjacent on the downstream side in the transporting direction is in the non-operating state, even if the operation order switch group S2 orders the start of operation of the vertical orientation transporting unit 24.

Like in the second embodiment, it is also possible to adopt a configuration in which the control member H does not simply prohibit operation of a vertical orientation transporting unit 24 with respect to which the vertical orientation transporting unit 24 adjacent on the downstream side in the transporting direction is in the non-operating state, but also the start of operation of when the object sensor T detects the presence of the glass substrate 2 on a vertical orientation transporting unit 24 with respect to which the vertical orientation transporting unit 24 on the downstream side in the transporting direction is in the operating state.

Also, the control member H is configured such that, with regard to operating the plurality of vertical orientation transporting units 24, it activates the vertical air-supplying-type support means 26 of the vertical orientation transporting unit 24 that is to be operated at the weak air state and changes the vertical orientation air-supplying-type support means 26 of the vertical type transporting unit 24 to which transfer is to be made from the weak air state to the supporting operation state at the upstream transfer timing, which is before the transfer timing.

In the third embodiment, since a sub-fan-filter unit is not provided, a control block diagram obtained by, in FIG. 10, omitting the sub-fan-filter unit 21 and changing the electric motor 16 changed to the electric motor 28.

FURTHER EMBODIMENTS (1) In the first and third embodiments described above, the control member H, during manual operation only, allows the start of operation of the transporting unit 1 with respect to which the transporting unit 1 (in the third embodiment, the vertical orientation transporting unit 24) adjacent downstream in the transporting direction is in the operating state and prohibits the start of operation of the transporting unit 1 with respect to which the transporting unit 1 adjacent downstream in the transporting direction is in the non-operating state. However, it is also possible to adopt a configuration in which the control member H, during both manual operation and automatic operation, or during automatic operation only, allows the start of operation of the transporting unit 1 with respect to which the transporting unit 1 adjacent downstream in the transporting direction is in the operating state and prohibits the start of operation of the transporting unit 1 with respect to which the transporting unit 1 adjacent downstream in the transporting direction is in the non-operating state.

(2) In the first and third embodiments described above, the control member H prohibits the start of operation when the object sensor T in the transporting unit 1 with respect to which the transporting unit 1 (in the third embodiment, the vertical orientation transporting unit 24) adjacent downstream in the transporting direction is in the non-operating state detects the presence of the glass substrate 2, but it is also possible to adopt an implementation in which the start of operation is prohibited for all transporting units 1 with respect to which the transporting unit 1 adjacent downstream in the transporting direction are in the non-operating state regardless of whether the sensor T detects the presence of the glass substrate 2. In this case, it is possible to either provide or not provide the sensor T.

(3) In the second and third embodiments, the control member H changes the fan filter units 7 and 7a from the weak air state to the supporting operation state at the upstream transfer timing, which is before the transfer timing, but it is sufficient that the timing at which the fan filter units 7 and 7a of the transporting units 1 and the vertical orientation transporting units 24 to which transfer is to be made are changed from the weak air state to the supporting operation state is before the transfer timing, and for example this can be a timing this is earlier than the upstream transfer timing. Either way, taking into consideration the time required for changing the operating state of the air-supplying-type support means 3 or the transporting speed of the glass substrate 2, for example, it is preferable that the upstream transfer timing allows sufficient time for the transporting unit 1 to which transfer is to be made to contactlessly support the glass substrate 2 that is to be transferred.

(4) In the second and third embodiments, the control member H activates the air-supplying-type support means 3 and the vertical orientation air-supplying-type support means 26 at the weak air state, and changes the air-supplying-type support means 3 and the vertical orientation air-supplying-type support means 26 of the transporting unit 1 and the vertical orientation transporting unit 24 for transfer from the weak air state to the supporting operation state before the transfer timing, but it is also possible for the control member H to keep the air-supplying-type support means 3 and the vertical orientation air-supplying-type support means 26 of the transporting unit 1 and the vertical orientation transporting unit 24 for transfer in the operation stop state, and to start operation such that the air-supplying-type support means 3 and the vertical orientation air-supplying-type support means 26 of the transporting unit 1 and the vertical orientation transporting unit 24 for transfer are put into the supporting operation state prior to the transfer timing.

Incidentally, in this case it is possible to operate the air-supplying-type support means 3 and the vertical orientation air-supplying-type support means 26 at only the supporting operation state, it is not necessary for them to be capable of changing between the weak air state and the supporting operation state.

Figure 17:
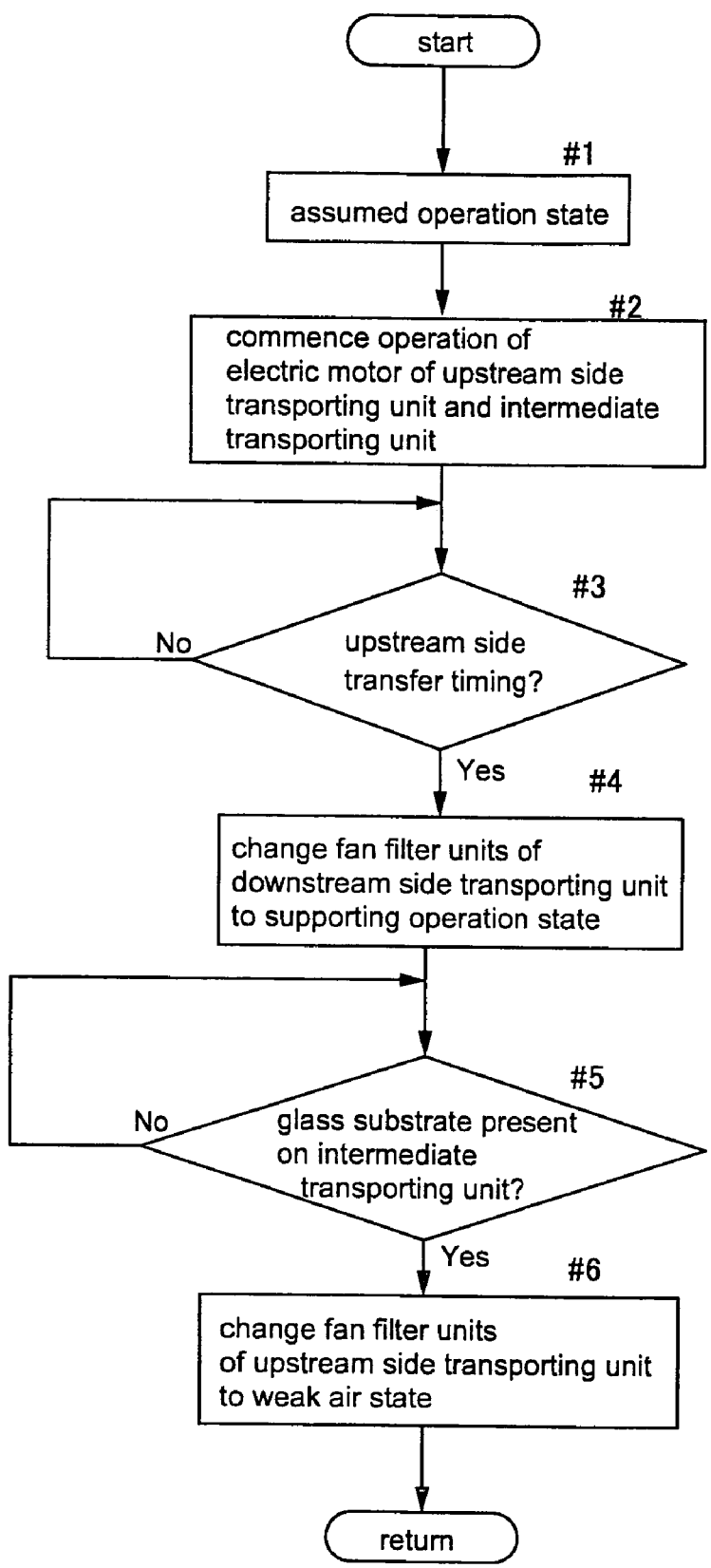
FIG. 17 is a flow chart of a transporting apparatus according to a separate embodiment.

(5) In the second and third embodiments, the upstream transfer timing is detected by the activating the electric motor 16 such that the glass substrate 2 is transferred to a transporting unit 1 that is more upstream than the transporting unit 1 adjacent upstream in the transporting direction, but for example it is also possible to provide a sensor or the like for detecting that the glass substrate 2 has been transferred onto a transporting unit 1 that is more upstream than the transporting unit 1 adjacent upstream in the transporting direction, and by detecting with this sensor that the glass substrate 2 has been transferred, it is possible to detect the upstream timing. FIG. 17 shows a more general flowchart than the flowchart shown in FIG. 14.

(6) In the second and third embodiments, all the transporting units 1 are operated, but for example it is also possible for two transporting units 1, namely the transporting unit 1 on whose transporting route the substrate 2 is present and the transporting unit 1 adjacent to that transporting unit 1 on the downstream side in the transporting direction, to be operated. That is, it is possible for only some of the plurality of transporting units 1 to serve as the transporting units to be operated, and the manner in which the transporting units to be operated are set can be suitably changed.

(7) In the first embodiment, the air discharge opening 23 connecting the transporting space A and the accommodation space B is formed in a lateral surface portion of the accommodation frame 12a, however it is also possible to adopt a configuration in which the air discharge opening 23 is not formed such that the transport space A and the accommodation space B are not connected.

(8) The first and third embodiments described an example of the fan filter units 7 and 7a in which the dust removal filter 5 and the blower fan 6 are combined into a single unit, but it is not absolutely necessary that the dust removal filter 5 and the blower fan 6 are attached as a single unit, and it is also possible to adopt a configuration in which, for example, a guide route or the like for guiding air blown by the blower fan 6 to the dust removal filter 5 is provided, and the dust removal filter 5 and the blower fan 6 are configured as separate members.

(9) In the first and third embodiments, the glass substrate 2 was illustrated as an example of the transported object, but various other types of articles such as plate-shaped work pieces or disk-shaped work pieces can also be adopted.

(10) It is also possible to use a rotating type knob or touch panel in place of the switch as the manually operated operation ordering means for ordering the start of operation.

What is claimed is:

1. A transporting apparatus, comprising:
a) a plurality of transporting means aligned in a transporting direction, each transporting means comprising:
  i) air-supplying-type support means for supplying air toward a lower surface portion of a transported object to contactlessly support the transported object, the air-supplying-type support means including a blower fan and a filter disposed in a blowing direction of the blower fan; and
  ii) drive force application means for applying a drive force in the transporting direction to the transported object that is supported by the air-supplying-type support means; and
b) control means for controlling operation of the plurality of transporting means, wherein the control means allows an upstream side transporting means of the plurality of transporting means to operate if a downstream side transporting means, located downstream with respect to the transporting direction relative to the upstream side transporting means, is in an operating state, and prohibits the start of operation of the upstream side transporting means if the downstream side transporting means is in a non-operating state.

2. The transporting apparatus according to claim 1,
wherein one transporting means and another one of the plurality of transporting means are a transporting means on the downstream side and an adjacent transporting means on the upstream side in the transporting direction respectively; and
wherein the control means allows the upstream side transporting means to start operation if the downstream side transporting means is in an operating state, and prohibits the start of operation of the upstream side transporting means if the downstream side transporting means is in a non-operating state.

3. The transporting apparatus according to claim 2, further comprising:
manually operated operation ordering means for ordering the start of operation far each of the plurality of transporting means;
wherein the control means, if the downstream side transporting means is in the operating state, starts operation of the upstream side transporting means when the operation ordering means orders the start of operation of the upstream side transporting means, and if the downstream side transporting means is in the non-operating state, prohibits the start of operation of the upstream side transporting means even if the operation ordering means orders the start of operation of the upstream side transporting means.

4. The transporting apparatus according to claim 3,
wherein the transporting means is provided with object detection means for detecting whether the transported object is present on the transporting route of that transporting means; and
wherein the control means prohibits the start of operation of the upstream side transporting means, if the downstream side transporting means is in the non-operating state, when the object detection means of the upstream side transporting means detects the presence of the transported object.

5. A transporting apparatus comprising:
a) a plurality of transporting means aligned in a transporting direction, each transporting means comprising:
  i) air-supplying-type support means for supplying air toward a lower surface portion of a transported object to contactlessly support the transported object, the air-supplying-type support means including a blower fan and a filter disposed in the blowing direction of the blower fan; and
  ii) drive force application means for applying a drive force in the transportation direction to the transported object that is supported by the air-supplying-type support means; and
b) control means for controlling operation of the plurality of transporting means, wherein the control means controls the operating state of the air-supplying-type support means of a downstream side transporting means before a transfer timing such that the transported object can be contactlessly supported by the air-supplying-type support means of the downstream side transporting means at the transfer timing at which the transported object on an upstream side transporting means, located upstream with respect to the transporting direction relative to the downstream side transporting means, is transferred to the downstream side transporting means.

6. The transporting apparatus according to claim 5,
wherein the control means controls the operating state of the air-supplying-type support means of the downstream side transporting means before an upstream transfer timing such that the transported object can be contactlessly supported by the air-supplying-type support means of the downstream side transporting means wherein the upstream transfer timing occurs when the transported object is transferred to the upstream side transporting means.

7. The transporting apparatus according to claim 5,
wherein the air-supplying-type support means is configured so as to supply purified air toward a lower surface portion of the transported object through a dust-removal filter, and the air-supplying-type support means can be changed between a supporting operation state in which an amount of purified air supplied toward the lower surface portion of he transported object is a supporting supplying amount for contactlessly supporting the transported object, and a weak air state in which said air amount is less than the supporting supplying amount; and
wherein the control means changes the air-supplying-type support means of the downstream side transporting means from the weak air state, which is the state after operation is started, to the supporting operation state before the transfer timing.

8. The transporting apparatus according to claim 1,
wherein the transporting means includes a porous plate provided between the blower fan and a space where a transported object is transported.

9. The transporting apparatus according to claim 8,
wherein the drive force application means includes a plurality of drive rollers and an electric motor that drives the drive rollers.

10. The transporting apparatus according to claim 9 further including at least one of a sensor that detects rotation of the blower fan, and a sensor that detects rotation of the electric motor, wherein the control means determines whether the downstream side transporting means is in the operating or non-operating state based on a signal from the at least one of the sensors.

11. The transporting apparatus according to claim 1, wherein the control means determines whether the downstream side transporting means is in the operating or non-operating state based on whether operation start command has been given to the transporting means.

12. The transporting apparatus according to claim 5, wherein the transporting means includes a porous plate provided between the blower fan and a space where a transported object is transported.

13. The transporting apparatus according to claim 12, wherein the drive force application means includes a plurality of drive rollers and an electric motor that drives the drive rollers.

14. The transporting apparatus according to claim 13 further including at least one of a sensor that detects rotation of the blower fan, and a sensor that detects rotation of the electric motor, wherein the control means determines whether the downstream side transporting means is in the operating or non-operating state based on a signal from the at least one of the sensors.

15. The transporting apparatus according to claim 1, wherein the control means determines whether the downstream side transporting means is in the operating or non-operating state based on whether operation start command has been given the transporting means.

* * * * *

UNITED STATES PATENT AND TRADEMARK OFFICE
CERTIFICATE OF CORRECTION

PATENT NO. : 7,140,827 B2  Page 1 of 1
APPLICATION NO. : 10/899542
DATED : November 28, 2006
INVENTOR(S) : Ikehata et al.

It is certified that error appears in the above-identified patent and that said Letters Patent is hereby corrected as shown below:

Column 17, Line 51, Claim 3, "far each of the" should read -- for each of the --

Column 18, Line 52, Claim 7, "portion of he" should read -- portion of the --

Column 20, Line 16, Claim 15, "given the" should read -- given to the --

Signed and Sealed this

Tenth Day of April, 2007

JON W. DUDAS
*Director of the United States Patent and Trademark Office*